United States Patent [19]

Ho-Lung et al.

[11] Patent Number: 5,692,207

[45] Date of Patent: Nov. 25, 1997

[54] DIGITAL SIGNAL PROCESSING SYSTEM WITH DUAL MEMORY STRUCTURES FOR PERFORMING SIMPLEX OPERATIONS IN PARALLEL

[75] Inventors: Michael George Ho-Lung, Boca Raton; Judith Marie Linger, Delray Beach; Baiju Dhirajlal Mandalia, Boca Raton; John Claude Sinibaldi, Pompano Beach, all of Fla.

[73] Assignee: International Business Machines Corporation, Armonk, N.Y.

[21] Appl. No.: 355,793

[22] Filed: Dec. 14, 1994

[51] Int. Cl.[6] .................................................. G06F 9/00
[52] U.S. Cl. ........................ 395/800; 395/375; 364/736; 364/232.8; 364/258; 364/262.4; 364/DIG. 1
[58] Field of Search ..................................... 395/800, 823, 395/825, 827, 840, 841, 878, 885, 375, 429, 430, 421.01, 421.08, 650; 364/242.4, 258, 260, 131-134, 736; 360/39, 48

[56] References Cited

U.S. PATENT DOCUMENTS

| | | | |
|---|---|---|---|
| 4,511,966 | 4/1985 | Hamada | 395/775 |
| 4,528,625 | 7/1985 | McDonough et al. | 395/550 |
| 4,577,282 | 3/1986 | Caudel et al. | 395/800 |
| 4,689,738 | 8/1987 | Van Wijk et al. | 395/800 |
| 4,755,965 | 7/1988 | Mary et al. | 395/550 |
| 5,247,627 | 9/1993 | Murakami et al. | 395/375 |
| 5,291,614 | 3/1994 | Baker et al. | 395/800 |

*Primary Examiner*—Alpesh M. Shah
*Attorney, Agent, or Firm*—Anthony N. Magistrale; Richard A. Tomlin; Ronald V. Davidge

[57] ABSTRACT

A digital signal processing system includes a first and second memory coupled to first and second register banks respectively. The system further includes first and second multipliers coupled to the first and second register banks for producing first and second product outputs respectively. The system also includes an arithmetic logic unit having first, second and third inputs and an output. The first input is coupled to the first product output and the second and third inputs are selectively coupled to either of the second product output and the first and second register means. The arithmetic logic unit output is coupled to the first and second register banks for accumulating the sample values in the first and second register banks. The system further includes Instruction control for storing a plurality of instruction op codes and controlling the system to compute the sample values by performing simplex operations during each cycle of a plurality of operating cycles of a digital signal processing procedure.

25 Claims, 18 Drawing Sheets

| | | | |
|---|---|---|---|
| R@SD→M1(BAR1) | R@SDp→M2(BAR2) | R@SD→M1(BAR1+) | R@SDp→M2(BAR2) |
| R@SD→M1(BAR1) | R@SDp←M2(BAR2) | R@SD→M1(BAR1+) | R@SDp←M2(BAR2) |
| R@SD←M1(BAR1) | R@SDp→M2(BAR2) | R@SD←M1(BAR1+) | R@SDp→M2(BAR2) |
| R@SD←M1(BAR1) | R@SDp←M2(BAR2) | R@SD←M1(BAR1+) | R@SDp←M2(BAR2) |
| R@SD→M1(BAR1) | R@SDp→M2(BAR2+) | R@SD→M1(BAR1+) | R@SDp→M2(BAR2+) |
| R@SD→M1(BAR1) | R@SDp←M2(BAR2+) | R@SD→M1(BAR1+) | R@SDp←M2(BAR2+) |
| R@SD←M1(BAR1) | R@SDp→M2(BAR2+) | R@SD←M1(BAR1+) | R@SDp→M2(BAR2+) |
| R@SD←M1(BAR1) | R@SDp←M2(BAR2+) | R@SD←M1(BAR1+) | R@SDp←M2(BAR2+) |

*FIG. 2.*

| F1 : F3 | ALU Operation |
|---|---|
| 0 0 0 | R@SA + RM + RMp |
| 0 0 1 | R@SA − RM + RMp |
| 0 1 0 | R@SA + RM − RMp |
| 0 1 1 | R@SA − RM − RMp |
| 1 0 0 | R@SA + RM |
| 1 0 1 | R@SA − RM |
| 1 1 0 | SNOP |
| 1 1 1 | (Not Assigned) |

*FIG. 3.*

| M | F0 | RM | RMp |
|---|---|---|---|
| 0 | 0 | R@SC * R5 | R5p * R@SCp |
| 0 | 1 | R@SC * R5p | R5 * R@SCp |
| 1 | 0 | R@SC * R5p | R5 * R@SCp |
| 1 | 1 | R5 * R5p | R@SC * R@SCp |

*FIG. 4.*

```
AR = 0000 <OP Code> → R@AR : Load OP Reg 0
AR = 0001 <OP Code> → R@AR : Load OP Reg 1
AR = 0010 <OP Code> → R@AR : Load OP Reg 2
AR = 0011 <OP Code> → R@AR : Load OP Reg 3
AR = 0100 <OP Code> → R@AR : Load OP Reg 4
AR = 0101 <OP Code> → R@AR : Load OP Reg 5
AR = 0110 <OP Code> → R@AR : Load OP Reg 6
AR = 0111 <OP Code> → R@AR : Load IRAM Base Address
AR = 1000 <OP Code> → R@AR : Load DRAM Base Address
AR = 1001 <OP Code> → R@AR : Load Configuration Register
```

```
LOAD RB0,X'1000'   // LOAD IRAM BASE ADDRESS
LOAD RB1,X'8000'   // LOAD DRAM BASE ADDRESS
LOAD RB2,OP1       // LOAD OP REG 1
LOAD RB3,OP2       // LOAD OP REG 2
LOAD RB9,X'4032'   // LOAD LOOP COUNT WITH 3 AND OP-COUNT WITH 2
                   // ...MODULO SPEC OF 256 FOR I-RAM, D-RAM SPECIFIED ELSEWHERE
ACL BEGIN          // INITIATE ACCELERATOR INSTRUCTION
INST1              // CODED INSTRUCTION
(PNOP1)            // INSERTED BY HARDWARE
(PNOP2)            // INSERTED BY HARDWARE
INST2              // CODED INSTRUCTION
NEXTOP             // NEXT INLINE INSTRUCTION
```

FIG. 10.

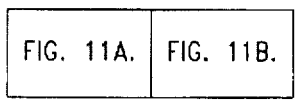

FIG. 11.

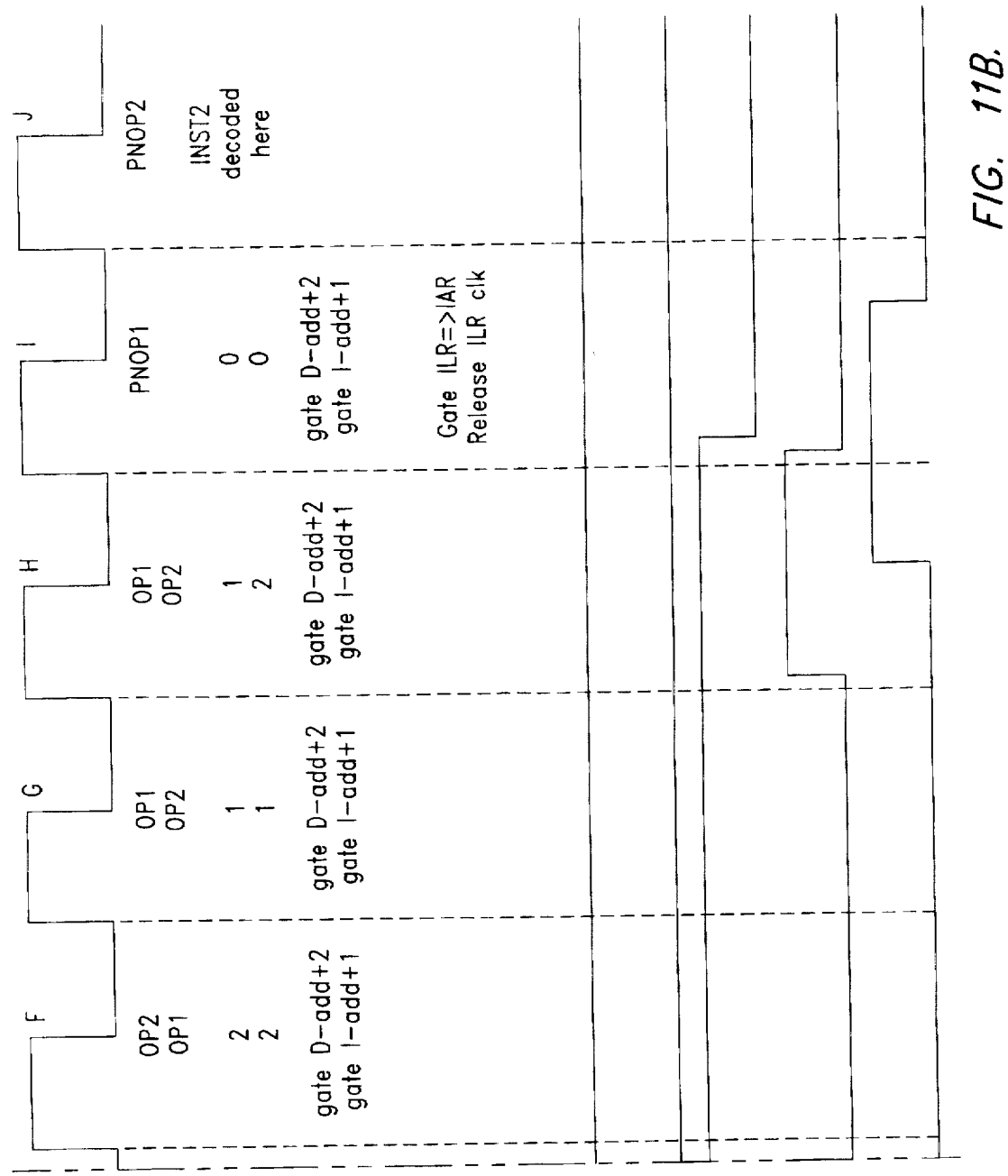

```
GOACL    EQU    *                                                        ;
         ACLSETUP  ACLMODE1                                               ;Assembler Directive for Accelerate Mode
         ARDB=@DATABUFF+'0000'x                                           ;Load DRAM Data Buffer Address
         ARIB=@COEVTEST+'0000'x                                           ;Load IRAM Coefficient Address
OPBEGIN  EQU    *
         AR0=(R1=0(ARDB+)   R1P=0(ARIB+)   R6W=R6W+RM+RMp   R5*R5p   R0*R0p
         AR1=(R5=0(ARDB+)   R5P=0(ARIB+)   R2W=R2W-RM+RMp   R0*R5p   R5*R0p
         AR2=(R0=0(ARDB+)   R0P=0(ARIB+)   R6W=R6W+RM+RMp   R5*R5p   R1*R1p
         AR3=(R5=0(ARDB+)   R5P=0(ARIB+)   R2W=R2W-RM+RMp   R1*R5p   R5*R1p
OPSIZ    EQU    ABS<*-OPBEGIN>                                            ;Op-Code Length Def. End
         ARCN=(ACLL='05'X   ACLM=0   ACL0=OPSIZ)                          ;Loop Length = 05
                                                                          ;l-Modulo Len=0 (Disabled
                                                                          ;Opcode Length=OPSIZE ;*/*  P  Register Initialize  */
         R0=#0                                                            ;Set R0  to Constant
         R0p=#0                                                           ;Set R0p to Constant
         R1=#0                                                            ;Set R1  to Constant
         R1P=#0                                                           ;Set R1P to Constant
         R2=#0                                                            ;Set R2  to Constant
         R2P=#'8000'X                                                     ;Init. R2P for Rounding
         R5=#0                                                            ;Set R5  to Constant
         R5p=#0                                                           ;Set R5p to Constant
         R6=#0                                                            ;Set R6  to Constant
         R6P=#'8000'X                                                     ;Set R6P to Constant ;*/*  P  Initialize the Accelerator  */
ACLBEGIN                                    ;INST1                        ;Initiate Accelerator
         R2*R5                              ;INST2                        ;Init RM and RMP to '0000'X
                                                                          ;Executed after Accel Done:
```

| FIG. 15A. | FIG. 15B. | FIG. 15C. |
|---|---|---|

FIG. 15A.

| Cycle | Operation | | | |
|---|---|---|---|---|
| 1 | R1=(ARDB+) | R1p=(ARIB+) | (R6W=R6W+RM+RMp) | (R5*R5p) | (R0*R0p) |
| 2 | R5=(ARDB+) | R5p=(ARIB+) | (R2W=R2W−RM+RMp) | (R0*R5p) | R5*R1p |
| 3 | R0=(ARDB+) | R0p=(ARIB+) | (R6W=R6W+RM+RMp) | R5*R5p | R1*R1p |
| 4 | R5=(ARDB+) | R5p=(ARIB+) | R2W=R2W−RM+RMp | R1*R5p | R5*R1p |
| 5 | R1=(ARDB+) | R1p=(ARIB+) | R6W=R6W+RM+RMp | R5*R5p | R0*R0p |
| 6 | R5=(ARDB+) | R5p=(ARIB+) | R2W=R2W−RM+RMp | R0*R5p | R5*R1p |
| 7 | R0=(ARDB+) | R0p=(ARIB+) | R6W=R6W+RM+RMp | R5*R5p | R1*R1p |
| 8 | R5=(ARDB+) | R5p=(ARIB+) | R2W=R2W−RM+RMp | R1*R5p | R5*R1p |
| 9 | R1=(ARDB+) | R1p=(ARIB+) | R6W=R6W+RM+RMp | R5*R5p | R0*R0p |
| ... | ... | ... | ... | ... | ... |
| 63 | R0=(ARDB+) | R0p=(ARIB+) | R6W=R6W+RM+RMp | R5*R5p | R1*R1p |
| 64 | R5=(ARDB+) | R5p=(ARIB+) | R2W=R2W−RM+RMp | R1*R5p | R5*R1p |
| 65 | (R1=(ARDB+)) | R1p=(ARIB+)) | R6W=R6W+RM+RMp | R5*R5p | R0*R0p |
| 66 | (R5=(ARDB+)) | R5p=(ARIB+)) | R2W=R2W−RM+RMp | R0*R5p | R5*R1p |
| 67 | (R0=(ARDB+)) | R0p=(ARIB+)) | R6W=R6W+RM+RMp | (R5*R5p) | R1*R1p) |
| 68 | (R5=(ARDB+)) | R5p=(ARIB+)) | (R2W=R2W−RM+RMp) | (R1*R5p) | R5*R1p) |

Status of Registers

| Cycle | R0 | R0p | R1 | R1p | R5 | R5p | RM | RMp |
|---|---|---|---|---|---|---|---|---|
| 1 | 0 | 0 | | | 0 | 0 | 0 | 0 |
| 2 | | | xr(k-0) | hr(0) | | hi(0) | 0 | 0 |
| 3 | xr(k-1) | hr(1) | | | xi(k-0) | | hi(0)*xi(k-0) | hr(0)*xr(k-0) |
| 4 | | | xr(k-2) | hr(2) | xi(k-1) | hi(1) | hi(0)*xr(k-1) | hr(0)*xi(k-1) |
| 5 | xr(k-3) | hr(3) | | | xi(k-2) | hi(2) | hi(1)*xi(k-1) | hr(1)*xr(k-1) |
| 6 | | | xr(k-4) | hr(4) | xi(k-3) | hi(3) | hi(1)*xr(k-2) | hr(1)*xi(k-2) |
| 7 | | | | | | | hi(2)*xi(k-2) | hr(2)*xr(k-2) |
| 8 | | | | | | | hi(2)*xr(k-3) | hr(2)*xi(k-3) |
| 9 | | | | | | | hi(3)*xi(k-3) | hr(3)*xr(k-3) |
| ... | ... | ... | ... | ... | ... | ... | ... | ... |
| 63 | xr(k-31) | hr(31) | | | xi(k-31) | hi(31) | hi(30)*xi(k-30) | hr(30)*xr(k-30) |
| 64 | | | | | | | hi(30)*xr(k-31) | hr(30)*xi(k-30) |
| 65 | | | 0 | 0 | | | hi(31)*xi(k-31) | hr(31)*xr(k-31) |
| 66 | | | | | | | hi(31)*xr(k-31) | hr(31)*xi(k-31) |
| 67 | 0 | 0 | | | 0 | 0 | 0 | 0 |
| 68 | | | | | | | 0 | 0 |

FIG. 15B.

Status of Registers

| Cycle | R2W | R5W |
|---|---|---|
| 1 | | |
| 2 | 0 | |
| 3 | | 0 |
| 4 | $-hi(0)xi(k-0)+hr(0)xr(k-0)=X0r$ | |
| 5 | | $hi(0)xr(k-0)+hr(0)xi(k-0)=X0i$ |
| 6 | $X0r-hi(1)xi(k-1)+hr(1)xr(k-1)=X1r$ | |
| 7 | | $X0i+hi(1)xr(k-1)+hr(1)xi(k-1)=X1i$ |
| 8 | $X1r-hi(2)xi(k-2)+hr(2)xr(k-2)=X2r$ | |
| 9 | | $X1i+hi(2)xr(k-2)+hr(2)xi(k-2)=X2i$ |
| : | : | : |
| : | : | : |
| 63 | | $X28i+hi(29)xr(k-29)+hr(29)xi(k-29)=X29i$ |
| 64 | $X29r-h(30)xi(k-30)+hr(30)xr(k-30)=X30r$ | |
| 65 | | $X29i+hi(30)xr(k-30)+hr(30)xi(k-30)=X30i$ |
| 66 | $X30r-hi(31)xi(k-31)+hr(31)xr(k-31)=X31r$ | |
| 67 | | $X30i+hi(31)xr(k-31)+hr(31)xi(k-31)=X31i$ |
| 68 | 0 | |

| FIG. 16A. | FIG. 16B. |

FIG. 16A.

| Cycle | Operation | | | |
|---|---|---|---|---|
| 1 | R1=(ARDB+) | R1p=(ARIB+) | (R6W=R6W+RM−RMp) | (R5*R5 R0p*R5p) |
| 2 | R5=(ARDB+) | R5p=(ARIB+) | (R2W=R2W+RM+RMp) | (R0*R5p R0p*R5) |
| 3 | R0=(ARDB+) | R0p=(ARIB+) | (R6W=R6W+RM+RMp) | R1*R5 R1p*R5p |
| 4 | R5=(ARDB+) | R5p=(ARIB+) | R2W=R2W+RM+RMp | R1*R5p R1p*R5 |
| 5 | R1=(ARDB+) | R1p=(ARIB+) | R6W=R6W+RM+RMp | R0*R5 R0p*R5p |
| 6 | R5=(ARDB+) | R5p=(ARIB+) | R2W=R2W+RM+RMp | R0*R5p R0p*R5 |
| 7 | R0=(ARDB+) | R0p=(ARIB+) | R6W=R6W+RM+RMp | R1*R5 R1p*R5p |
| 8 | R5=(ARDB+) | R5p=(ARIB+) | R2W=R2W+RM+RMp | R1*R5p R1p*R5 |
| 9 | R1=(ARDB+) | R1p=(ARIB+) | R6W=R6W+RM+RMp | R0*R5 R0p*R5p |
| .. | .. | .. | .. | .. |
| 63 | R0=(ARDB+) | R0p=(ARIB+) | R6W=R6W+RM+RMp | R1*R5 R1p*R5p |
| 64 | R5=(ARDB+) | R5p=(ARIB+) | R2W=R2W+RM+RMp | R1*R5p R1p*R5 |
| 65 | (R1=(ARDB+) | R1p=(ARIB+)) | R6W=R6W+RM+RMp | R0*R5 R0p*R5p |
| 66 | (R5=(ARDB+) | R5p=(ARIB+)) | R2W=R2W+RM+RMp | R0*R5p R0p*R5 |
| 67 | (R0=(ARDB+) | R0p=(ARIB+)) | R6W=R6W+RM+RMp | (R1*R5 R1p*R5p) |
| 68 | (R5=(ARDB+) | R5p=(ARIB+)) | (R2W=R2W+RM+RMp) | (R1*R5p R1p*R5) |

Status of Registers

| Cycle | R0 | R0p | R1 | R1p | R5 | R5p | RM | RMp | R2W | R6W |
|---|---|---|---|---|---|---|---|---|---|---|
| 1 | 0 | 0 | 0 | hi(0) | 0 | 0 | | | | 0 |
| 2 | | hi(1) | hr(0) | | xr(k-0) | xi(k-0) | hr(0)*xr(k-0) | hi(0)*xi(k-0) | 0 | 0 |
| 3 | hr(1) | | | hi(2) | | | hr(0)*xi(k-0) | hi(0)*xr(k-0) | X0r | X0i |
| 4 | | hi(3) | hr(2) | | xr(k-1) | xi(k-1) | hr(1)*xr(k-1) | hi(1)*xi(k-1) | X1r | X1i |
| 5 | hr(3) | | | hi(4) | | | hr(1)*xi(k-1) | hi(1)*xr(k-1) | X2r | X2i |
| 6 | | | hr(4) | | xr(k-2) | xi(k-2) | hr(2)*xr(k-2) | hi(2)*xi(k-2) | | |
| 7 | | | | | | | hr(2)*xi(k-2) | hi(2)*xr(k-2) | | |
| 8 | | | | | xr(k-3) | xi(k-3) | hr(3)*xr(k-3) | hi(3)*xi(k-3) | | |
| 9 | | | | | | | hr(3)*xi(k-3) | hi(3)*xr(k-3) | | |
| .. | .. | .. | .. | .. | .. | .. | .. | .. | .. | .. |
| 63 | hr(31) | hi(31) | | | xr(k-31) | xi(k-31) | hr(30)*xr(k-30) | hi(30)*xi(k-30) | | X29i |
| 64 | | | | | | | hr30)*xi(k-30) | hi(30)*xr(k-30) | X30r | X30i |
| 65 | | | 0 | 0 | 0 | 0 | hr(31)*xr(k-31) | hi(31)*xi(k-31) | X31r | X31i |
| 66 | | | | | | | hr(31)*xi(k-31) | hi(31)*xr(k-31) | | |
| 67 | 0 | 0 | | | 0 | 0 | 0 | 0 | 0 | |
| 68 | | | | | | | | | | |

| FIG. 17A. |
|---|
| FIG. 17B. |

FIG. 17A.

| Cycle | | Operation | | | |
|---|---|---|---|---|---|
| 1 | R1=(ARDB+) | R1p=(ARIB+) | | | |
| 2 | R5=(ARDB+) | R5p=(ARIB+) | | | |
| 3 | R1=(ARDB) | (ARIB+)=R1p | snop | | |
| 4 | R5=(ARDB+) | R5p=(ARIB+) | R2W=R2W+RM+RMp | R5*R5p | R1*R1p |
| 5 | R1=(ARDB+) | R1p=(ARIB+) | R6W=R6W+RM+RMp | R1*R5p | R5*R1p |
| 6 | R5=(ARDB) | (ARIB+)=R1p | snop | R1*R1p | R5*R5p |
| 7 | R1=(ARDB+) | R1p=(ARIB+) | R2W=R2W+RM+RMp | R5*R1p | R1*R5p |
| 8 | R5=(ARDB+) | R5p=(ARIB+) | R6W=R6W+RM+RMp | | |
| 9 | R1=(ARDB) | (ARIB+)=R1p | snop | R5*R5p | R1*R1p |
| ... | ... | ... | ... | ... | ... |
| 45 | R1=(ARDB) | (ARIB+)=R1p | snop | R5*R5p | R1*R1p |
| 46 | R5=(ARDB+) | R5p=(ARIB+) | R2W=R2W+RM+RMp | R1*R5p | R5*R1p |
| 47 | R1=(ARDB+) | R1p=(ARIB+)) | R6W=R6W+RM+RMp | | |
| 48 | R5=(ARDB) | (ARIB+)=R1p | snop | R1*R1p | R5*R5p |
| 49 | | | R2W=R2W+RM+RMp | R5*R1p | R1*R5p |
| 50 | | | R6W=R6W+RM+RMp | | |

Status of Registers

| Cycle | R1 | R1p | R5 | R5p | RM | RMp | R2W | R6W |
|---|---|---|---|---|---|---|---|---|
| 1 | x0 | h0 | | | | | | |
| 2 | x2 | h0 | x1 | h1 | | | | |
| 3 | x3 | h3 | | | x1*h1 | x0*h0 | | |
| 4 | x4 | h4 | x2 | h2 | x2*h1 | x1*h0 | x0*h0+x1*h1=A1 | x1*h0+x2*h1=B1 |
| 5 | x3 | | | h2 | x3*h3 | x2*h2 | | |
| 6 | x4 | | x4 | | x4*h3 | x3*h2 | A1+x2*h2+x3*h3=A2 | B1+x3*h2+x4*h3=B2 |
| 7 | | | x5 | h5 | x5*h5 | x4*h4 | | |
| 8 | x6 | h4 | | | | | | |
| 9 | .. | .. | .. | .. | .. | .. | .. | .. |
| 45 | x30 | h28 | | | x29*h29 | x28*h28 | | |
| 46 | x31 | | x30 | h30 | x30*h29 | x28*h28 | A14+x28*h28+x29*h29=A15 | |
| 47 | | h31 | | | | | | B14+x29*h28+x30*h29=B15 |
| 48 | | | x32 | | x31*h31 | x30*h30 | A15+x30*h30+x31*h31=y0 | |
| 49 | | | | | x32*h31 | x32*h30 | | B15+x31*h30+x32*h31=y1 |
| 50 | | | | | | | | |

FIG. 17B.

DIGITAL SIGNAL PROCESSING SYSTEM WITH DUAL MEMORY STRUCTURES FOR PERFORMING SIMPLEX OPERATIONS IN PARALLEL

BACKGROUND OF THE INVENTION

1. Field of the Invention

The present invention relates generally to digital signal processing systems and more particularly, to an improved digital signal processor architecture for computing sample values for a variety of digital signal processing algorithms which involve many simplex operations including multiplication, addition, subtraction and memory loads/stores.

2. Description of Related Art

It is well known that applications requiring digital signal processing are expanding tremendously. For example, applications requiring complex real time processing (voice and image processing, pattern and voice recognition, artificial intelligence and scientific computation in general) are obviously becoming commonly requested. Most of these applications require filtering (convolution) or correlation operations which are fairly high processor computing power consumers. Signal processor architectures have therefore been looked for, which would optimize available computing power versus processor size and power supply requirements.

Taking into account that the above mentioned convolution/correlation operations involve repetitive digital multiplications, several processor architectures have been proposed which include multipliers, an Arithmetic Logic Unit (ALU) and accumulators. For example, U.S. Pat. No. 5,175,702 discloses a digital signal processor (DSP) architecture which includes several multiply/accumulate units (M-Units 0-K) connected to the DSP bus without requiring specific redesign of the original DSP chip. Each M-unit includes an ALU, a multiplier and delay elements. The M-units are cascaded so that an input data stream can propagate through each M-unit's delay elements T and RYi input which is fed into it's multiplier. The delays are programmable in such a way to allow the propagation to occur at different rates.

The multiplier of each M-unit's RX input is common to every unit (e.g., full parallel operation). Each M-unit also has two accumulation registers RAi and RBi which selectively accumulate the product of RX and RYi. Thus, when this pipeline is full, for each DSP instruction cycle, K simultaneous accumulations for the K sequential convolution (or cross correlation) sums will occur. Use of the two accumulation registers RAi and RBi can additionally result in the calculation of two consecutive zipped points. However, this architecture suffers from the disadvantages that it is specifically tailored for convolution type algorithms and cannot be adapted to efficiently perform other types of algorithms. In addition, this architecture is inefficient since each M-unit can only perform at most 1 load, 1 multiply and 1 add in 1 instruction cycle.

In addition, since the architecture requires K M-units where K is equal to one-half of the filter length the size of the device required to perform convolution/correlation algorithms increases with filter length resulting in a large and inefficient device. For example, for a filter length of 32, 16 M-units are required. This also results in a substantial amount of power consumption and requires a substantial amount of silicon to fabricate. Thus, further improvements are still being looked for to increase the speed of performance, increase flexibility to perform a wide range of algorithms and reduce device size.

SUMMARY OF THE INVENTION

The present invention is directed to a digital signal processing system that can process a variety of digital signal processing algorithms which involve many arithmetic or simplex calculations including multiplication, addition and subtraction and data to be read and/or stored. The system can compute sample values by performing up to six simplex operations in parallel during at least one cycle of a plurality of operating cycles of a first digital signal processing procedure. The system includes first and second register means for processing digital data. First and second memory means are coupled to the first and second register means respectively for storing a first plurality and a second plurality of data values respectively. The first and second memory means are operative to transfer any of the first and second plurality of data values between the first memory means and the first register means and between the second memory means and the second register means respectively.

The system further includes first and second multiplier means for producing first and second product outputs respectively. Each of the first and second multiplier means are coupled to the first and second register means. The system also includes an arithmetic logic means having first, second and third inputs and an output. The first input is coupled to the first product output and the second and third inputs are selectively coupled to either of the second product output and the first and second register means. The arithmetic logic means output is coupled to the first and second register means for accumulating sample values in the first and second register means. The system further includes instruction memory means for storing a plurality of instruction op codes and controlling the system to compute the sample values by performing simplex operations during each cycle of a plurality of operating cycles of the first digital signal processing procedure.

The system of the present invention can be in one of three modes 1) accelerate mode 1 (A1), 2) accelerate mode 0 (A0) and 3) non-accelerate mode (NA). In accelerate modes (1 and 0), the instruction op codes are programmable and operative to control the system to perform any one or more of the following simplex operations and any combination thereof during a particular instruction cycle; (1) transfer a first data value from the first memory means to the first register means, (2) transfer a second data value from the second memory means to the second register means, (3) multiply data on the first multiplier means and produce the first product output, (4) multiply data on the second multiplier means and produce the second product output, an arithmetic operation on the first and second (5) and third (6) arithmetic inputs to produce the arithmetic logic output and transfer the arithmetic logic output to the first and second register means. The present invention obtains increased efficiency by performing up to six simplex operations (two memory loads/stores, two arithmetic logic operations and two multiplications) in modes A1 or A0 during at least one of the plurality of instruction or operating cycles.

In mode A1, for algorithms that require complex numbers the first plurality of data values in the first memory means can be real and imaginary data values and the second plurality of data values in the second memory means can be real and imaginary coefficient values. Alternatively, in mode A0, the first plurality of data values in the first memory means can be real data and real coefficient values and the second plurality of data values in the second memory means can be imaginary data and imaginary coefficient values.

In one embodiment of the present invention, the first memory means can be a data RAM and the second memory means can be an instruction RAM of a Harvard architecture processor. The data RAM includes address generation means for generating addresses corresponding to memory locations in the data RAM and the instruction RAM includes address generation means for generating addresses corresponding to memory locations in the instruction RAM. The data RAM address generation means can include a first base address register for storing addresses corresponding to memory locations in the data RAM while the instruction RAM address generation means can include a second base address register for storing addresses corresponding to memory locations in the instruction RAM.

In the accelerate modes of operation, unlike a conventional Harvard architecture processor, the instruction RAM is used as a data path to run the accelerator function at its full potential to perform DSP algorithms such as those that require complex conjugate arithmetic functions. This mode takes advantage of the repetitive nature of the DSP algorithms. The above mentioned simplex operations (up to six) executed in one cycle represent one "complex" operation. Up to seven of these complex operations can be coded into instructions in any arrangement to form one element. Since the DSP algorithms are repetitive they can be constructed with a loop or repetitive execution of these elements.

More specifically, the instruction memory means can include a plurality of op code registers for storing the plurality of instruction op codes and loop control means for controlling the plurality of op codes in said plurality of op code registers to be executed in a repetitive loop until the first digital signal processing procedure is completed. The loop control means can include a programmable configuration register for storing an op code count indicating the number of op code registers to be used in one loop and a loop count indicating the number of times the plurality of instruction op codes will be executed. As an example, the number of op code registers (op code count) can be an integer number from 2 to 7 and the loop count can be an integer number from 2 to 255.

The system of the present invention can further include means for independently auto incrementing the first base address register such that the first data values will be sequentially transferred from adjacent memory locations in the data RAM to the first register means as the system cycles through each instruction in the loop. In addition, means are also provided for independently auto incrementing the second base address register such that the second data values will be sequentially transferred from adjacent memory locations in the instruction RAM to the second register means as the system cycles through each instruction in the loop.

In a further embodiment of the present invention, the instruction RAM is further operative to store a plurality of instructions for controlling the system of the present invention to perform a second digital signal processing procedure corresponding to mode NA. This embodiment includes means for switching control from the instruction memory means to the instruction RAM after the first digital signal processing procedure is completed such that the system switches from either one of the accelerate modes to the non-accelerate mode. In non-accelerate mode, the instruction RAM is conventionally used to perform instructions and the data RAM is used for data storage and transfer. This is referred to as a Harvard architecture.

In another embodiment of the present invention, the first and second memory means can be first and second segments of data RAM respectively. The first and second segments are coupled to a first and a second address bus respectively. The first memory means further includes a first address base register and a first modulo index device for generating first addresses on a first prime address bus corresponding to memory locations in the first data RAM segment. The second memory means further includes a second independently controllable address base register and a second independently controllable modulo index device for generating second addresses on a second prime address bus corresponding to memory locations in the second data RAM segment.

This embodiment further includes a common address bus and a first select means for coupling either one of the common address and the first prime address buses to the first address bus. In addition, second select means are provided for coupling either one of the common address and second prime address buses to second address bus. Logic means are coupled to the common address bus and the first and second select means for independently controlling the first and second select means to couple (1) either one of the common address bus and the first prime address bus to the first address bus and, (2) either one of the common address bus and the second prime address bus to the second address bus, respectively.

As stated above, since the DSP algorithms are repetitive they can be constructed with a loop or repetitive execution of the complex elements. More specifically, in the accelerate modes of operation for this embodiment, the instruction memory means includes on chip instruction memory means for storing the plurality of instruction op codes and instruction address generation means coupled to the on chip instruction memory means for generating addresses corresponding to memory locations in the on chip instruction memory means. The instruction memory means further includes instruction control means for executing the plurality of instruction op codes in a repetitive loop until the first digital signal processing procedure is completed. The instruction control means includes an op code count indicating the number of instruction op codes to be used in one loop and a loop count indicating the number of times the selected number of instruction op codes will be executed. For example, the op code count can be an integer number from 2 to 7 and the loop count can be an integer number from 2 to 255.

In a further embodiment of the present invention, the system further includes off chip memory means coupled to the common address bus for controlling the system to perform a second digital signal processing procedure corresponding to non-accelerate mode. This embodiment also includes means for switching control from the on chip memory means to the off chip memory means after the first digital signal processing procedure is completed such that the system switches from either one of the accelerate modes to the non-accelerate mode.

By utilizing the first memory means for one half of the data, the second memory means for the other half, two multiplier means and a three input arithmetic logic means the system of the present invention can simultaneously perform up to six simplex operations in parallel during at least one operating cycle thereby reducing the number of cycles needed to obtain a sample value and increasing efficiency. This feature coupled with the ability to program any combination of the simplex operations described above allows the digital signal processing system of the present invention to compute sample values for a wide range of algorithms and to perform them more efficiently than any prior art DSP system. In addition, the use of op code instructions in op code registers along with a repetitive loop of the instructions decreases the amount of memory needed for instructions and reduces the million instructions per second (MIPS) requirement of the repetitive execution of identical code.

BRIEF DESCRIPTION OF THE DRAWINGS

FIG. 2, is a table of all possible combinations of memory loads/stores used to transfer data between a selected register in bank 16 and the first data memory 12, and transfer data between a corresponding register in bank 18 and the second data memory 14 in accordance with the present invention.

FIG. 3 is a table of the arithmetic operations performed by the ALU 42 of FIG. 1 in 32 bit mode in accordance with the present invention.

FIG. 4 is a table of the operations performed by the multipliers 24 and 26 of FIG. 1 in accordance with the present invention.

FIG. 10 shows the pseudo code of an operational example of the system of FIGS. 1, 5 and 6.

FIG. 14 shows the assembler program language used to program the system of FIGS. 1, 5 and 6 in accelerate mode 1 to perform a complex equalizer algorithm.

FIG. 15 including FIGS. 15A, 15B, and 15C is a data flow table of the operations and register contents corresponding to the example of FIG. 14.

FIG. 16 including FIGS. 16A and 16B is a data flow table of the operations and register contents corresponding to a complex equalizer algorithm performed by the first embodiment in accelerate mode 0.

FIG. 17 including FIGS. 17A and 17B is a data flow table of the operations and register contents corresponding to a zipping algorithm performed by the first embodiment in accelerate mode 1.

DETAILED DESCRIPTION OF THE INVENTION

The present invention is directed to a system that can compute sample values for a variety of digital signal processing (DSP) algorithms which involve many arithmetic or simplex operations including multiplication, addition, subtraction and data transfer. The sample values are computed by performing simplex operations during each cycle of a plurality of operating cycles of a digital signal processing procedure. The architecture of the present invention obtains increased efficiency by allowing within one instruction cycle, the parallel execution of up to six simplex operations: two memory loads or stores, two multiplications and two arithmetic logic operations. In addition, the present invention allows small repetitive instruction sequences to be executed as one element, with hardware loop control, to further speed up operation and lower memory requirements.

Figure 1:
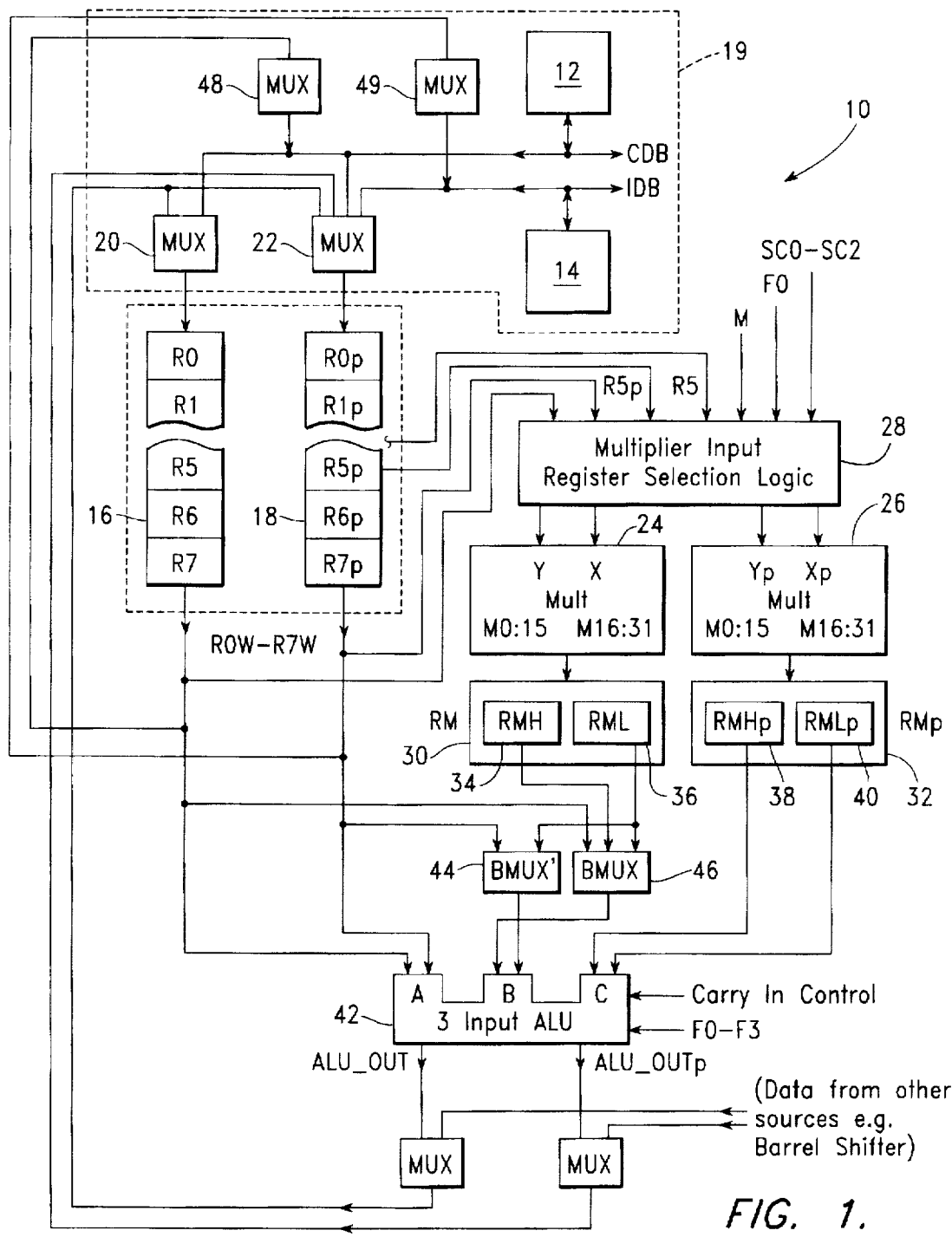
FIG. 1 is a block diagram of the digital signal processing system of the present invention.

Referring to FIG. 1, there is shown a schematic diagram of one embodiment of the DSP accelerator 10 of the present invention. The device 10 includes a first data memory 12 for storing a first plurality of data values and a second memory 14 for storing a second plurality of data values. Although the system 10 is based on a Harvard architecture, there are substantial differences between the architecture of the accelerator 10 and that of a conventional Harvard design. As will be described in more detail below, one such difference is that the first data memory 12 can be a data random access memory (data RAM) while the second data memory 14 can be a second data RAM or the instruction RAM of a Harvard architecture.

The first data memory 12 and the second data memory 14 are coupled to a common data bus (CDB) and an instruction data bus (IDB) respectively. The data bus CDB is coupled to first and second register banks 16, 18 via multiplexers 20, 22 respectively. The data bus IDB is coupled to register bank 18 via multiplexer 22. Each register bank 16 and 18 include 8 registers R0 through R7 (R0–R7), and R0p through R7p (R0p–R7p) respectively. Each of the sixteen registers can be sixteen bit registers which can be concatenated (in a manner that will be described further below) to yield 32 bit register banks (R0W–R7W) where the notation R0W means R0 concatenated with R0p (R0/R0p).

First and second multipliers 24, 26 each of which having two inputs X, Y and Xp, Yp respectively and an output are coupled to the first and second register banks 16, 18 via multiplier input selection logic 28. Logic 28 can route the data from four individual 16 bit register sources from register banks 16 and 18 to the four multiplier inputs X, Y, Xp, Yp. The four register sources can be X) any one of registers R0–R7, Y) R5 or R5p, Xp) any one of registers R0–R7 or R5p and Yp) any one of registers R0p–R7p. It should be noted that R5 and R5p have been arbitrarily selected and any other pair could have been used. The result of a multiplication of the two 16 bit inputs to multipliers 24 and 26 is a 32 bit product output for each multiplier. The 32 bit product from each multiplier 24, 26 is transferred to multiplier product registers 30 (RM), and 32 (RMp) respectively which consist of the upper and lower 16 bit product registers 34 (RMH), 36 (RML) and 38 (RMHp), 40 (RMLp) respectively.

A three input Arithmetic Logic Unit (ALU) 42 is coupled to registers RM, RMp and register banks 16, 18. The three input ALU 42 inputs are denoted A, B, and C. The ALU 42 can be in either 16 or 32 bit mode. Control logic (not shown) is used to switch between 16 and 32 bit modes. As described in more detail below, in the latter mode, the ALU 42 can perform an operation with two 32 bit operand inputs A and B or with three 32 bit operand inputs A, B and C. There are two 16 bit register sources for each input A, B and C. Each of the two 16 bit register sources input to ALU 42 are concatenated to produce the 32 bit operands as needed. More specifically, the A input can be any concatenated pair of registers in register banks 16 and 18 (e.g., R6/R6p), the B input can be register RM or any pair of registers in banks 16 and 18 (via multiplexers 44 and 46) and the C input can be register RMp. For example, in the expression ROW=ROW+ RM+Rmp, A=(R0/R0p), B=(RMH/RML) and C=(RMHp/ RMLp). After an operation is performed by the ALU 42 in 32 bit mode, the 16 bit outputs of the ALU 42 ALU_OUT and ALU_OUTp are then transferred to a first and second accumulation register in banks 16 and 18 respectively for accumulating sample values. The first and second accumulation registers can be any one of concatenated registers R0W-R7W.

In the 16 bit mode of operation of ALU 42, only the A and B inputs of ALU 42 are used. In addition, only 16 bits of the A and B inputs are used. The carry in control of ALU 42 will select one of the register inputs from register bank 16 or 18 for input A. The multiplexer 44 will select either the prime register bank 18 or RML and the multiplexer 46 will select either RMH, RML or the register bank 16. Thus, input B can be any one of the following 16 bit registers: R0–R7, R0p–R7p, RMH or RML. After an operation is performed by the ALU 42 in 16 bit mode, only the 16 bit output ALU_OUT is then transferred to an accumulation register in bank 16 or a register in bank 18.

The accelerator 10 can be in one of three modes 1) accelerate mode 1 (A1), 2) accelerate mode 0 (A0) and 3) non-accelerate mode (NA). In modes A0 and A1 the accelerator 10 is operative to simultaneously perform two memory loads/stores during at least one instruction cycle of the plurality of operating cycles needed to compute the sample values. In addition, in modes A0 and A1 the system 10 can simultaneously perform up to six simplex operations (two memory loads/stores, two multiplications and two ALU operations) during at least one of the plurality of operating cycles. For example, in one cycle each of the following simplex operations can be performed: 1) load R5 with a data value from memory 12 (R5=M1(BAR1+)), 2) load R5p with a data value from memory 14 (R5p=M2(BAR2+)), 3) add data in RM, RMp and 4) R2W and store result in R2W (R2W=R2W+RM+RMp), 5) multiply contents of R6 with contents of R5p and store result in RM (RM=R6*R5p) and 6) multiply contents of R6p with contents of R5 and store result in RMp (RMp=R6p*R5).

In mode A1 for algorithms that require complex numbers both real and imaginary data are stored in the first data memory 12 while real and imaginary coefficients are stored in the second data memory 14. In mode A0 real coefficients and real data are stored in data memory 12 while imaginary coefficients and imaginary data are stored in data memory 14. In mode NA only one memory load/store is performed in each operating cycle and at most up to four simplex operations can be performed in one cycle (one memory load/store, two ALU operations and one multiplication). Mode NA is not preferred since the accelerator 10 cannot perform two simultaneous memory loads/stores of data and cannot perform six simplex operations in any operating cycles. Although not preferred, mode NA is useful to initialize the accelerate modes.

With regard to memory loads/stores, the accelerator 10 is operative in modes A1 and A0 to perform any one of the following first two operations and any one of the following second two operations during at least one instruction cycle: (1)(i) transfer any one of the first plurality of data values from the first data memory 12 to any one register in register bank 16 via CDB and multiplexer 20 OR (ii) transfer data information from any one register in bank 16 to the first data memory 12 via multiplexer 48 and CDB, and (2)(i) transfer any one of the second plurality of data values from the second data memory 14 to any one register in register bank 18 via IDB and multiplexer 22 OR (ii) transfer data information from any one register in bank 18 to the second data memory 14 via multiplexer 49 and IDB. This transferring of data is referred to as memory load/stores. A memory load is when data is transferred from a data memory to a register (e.g., operations (1)(i) and (2)(i)) and a memory store is when data is transferred from a register to a data memory (e.g., operations (1)(ii) and (2)(ii)).

Referring to FIG. 2, there is shown a table of all possible combinations of memory loads/stores for the present invention. R@SD specifies any one of registers R0–R7. "p" indicates the prime register bank R0p–R7p, → indicates a write operation and ← indicates a read operation. The "+" indicates auto incrementation which is optional, and when used automatically increments a memory base address register to the next memory location for the next cycle of operation. For example, the notation R2=M1(BAR1+) means that data at the first memory RAM address specified by the first base address register is loaded into R2 and the first base address register is automatically incremented to the next RAM memory address. Similarly, the notation R2p= M2(BAR2+) means that data at the second memory RAM address specified by the second base address register is loaded into R2p and the second base address register is automatically incremented to the next memory address.

To summarize the table in FIG. 2, the load/store operations include all combinations (with or without auto incrementation) of transferring data between a selected register in bank 16 and the first data memory 12, transferring data between the corresponding register in bank 18 and the second data memory 14. It should be emphasized that any two of the load/stores shown in any row are performed during a single instruction cycle. For example, in the last row of the upper right hand box, data is transferred from the first memory 12 to the register specified by R@SD and data is transferred from the second memory 14 to the corresponding register specified by R@SDp during a single instruction cycle.

FIG. 3 is a table of the possible operations for ALU 42 in 32 bit mode. The three function (FUN) bits (F1–F3) are stored in an op code register (to be described in more detail below) and are supplied to ALU 42 to perform the ALU operations in accordance with the table in FIG. 3. R@SA indicates any two 16 bit registers concatenated to form a 32 bit word as for example R2/R2p=R2W. The register R@SA can be any one of registers R0–R7 concatenated with its corresponding prime register R0p–R7p. For example, the notation R2W=R2W+RM+RMp means that the data in registers R2/R2p is added to the data in registers RM and RMp and the result is stored in R2W. By utilizing a three input ALU 42, up to two arithmetic operations as shown in the first four rows can be performed during a single instruction cycle. For example, in the first row, data in register R@SA is added to data in RM and data in RMp during one instruction cycle.

Turning to FIG. 4, there is shown a table of the possible multiplier inputs to multipliers 24 and 26 along with the corresponding multiplier registers RM 30 and RMp 32 which contain the result. The mode bit M and FUN bit F0 are also stored in an op code register (shown and described in more detail below) and are supplied to the logic block 28 to perform the multiplier operations in accordance with the table in FIG. 4. For example, if the Mode bit M is 1 and the F0 bit is 0 then the multiplier output RM will equal the 32 bit product of the 16 bit register R5p and the 16 bit register specified by the SC bits while the multiplier output RMp would equal the product of R5 and the register specified by the SCp bits. By utilizing two multipliers, up to two multiplications can be performed in one instruction cycle. It should be noted that in some operations only one multiplication is required and accordingly, only multiplier 24 and product register RM are used. For such operations, the output of multiplier 26 and the C input of ALU 42 are not used.

Figure 5:
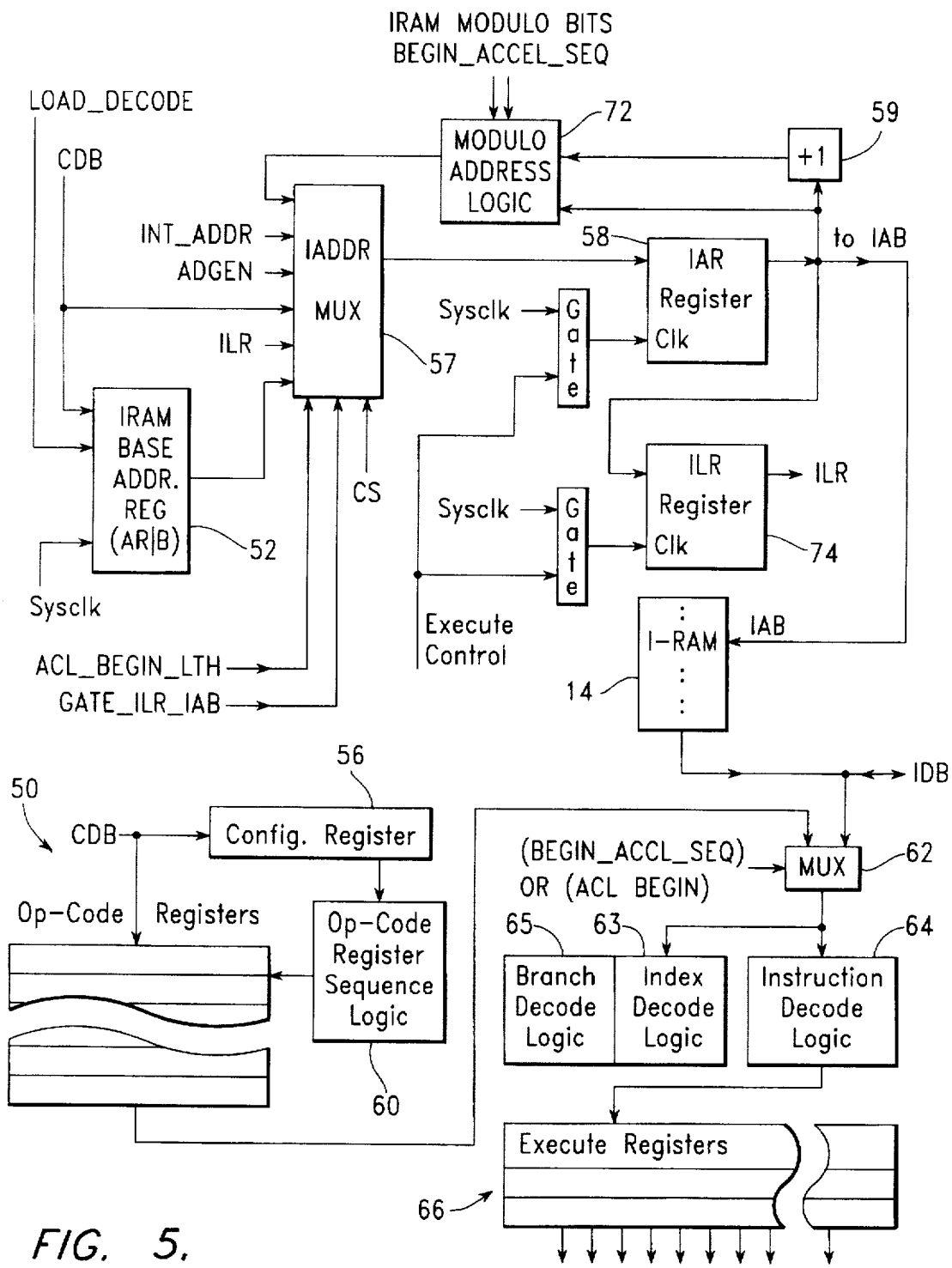
FIG. 5 is a schematic diagram of instruction RAM addressing and instruction control sequencing for a first embodiment of the present invention.
Figure 6:
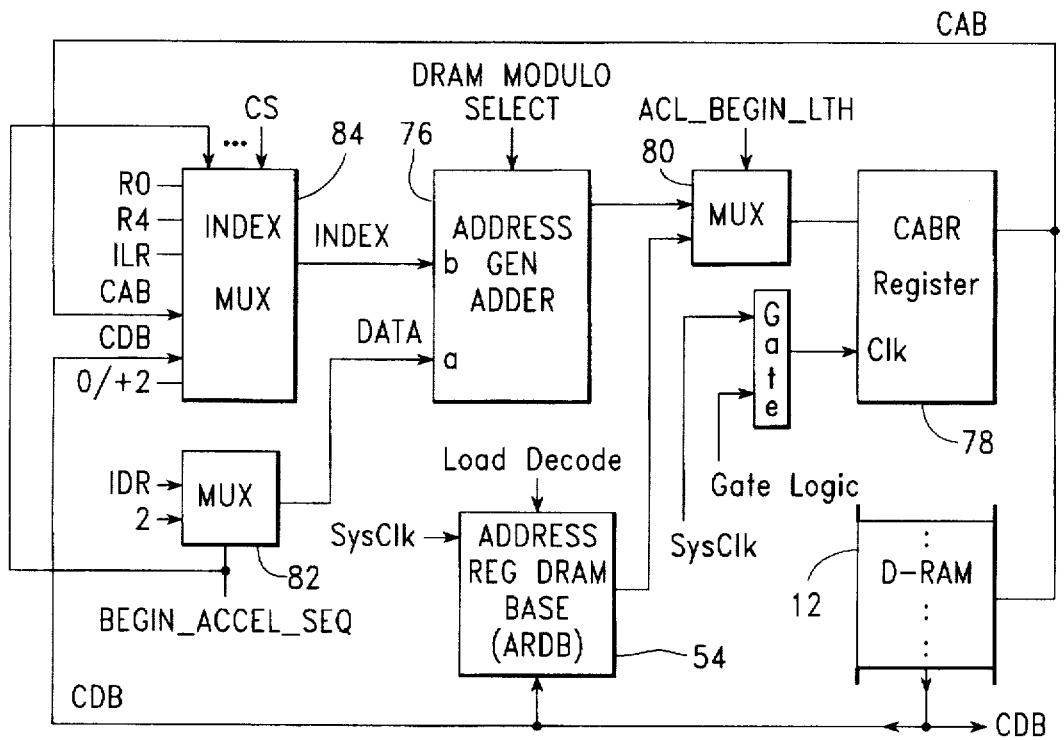
FIG. 6 is a schematic diagram of data RAM addressing for the first embodiment.

Referring now to FIGS. 5 and 6, there are shown schematic diagrams of memory data addressing and instruction control sequencing for the first embodiment of the DSP 10 of the present invention. In accelerate modes (1 and 0), external instruction RAM (IRAM) 14 of the Harvard architecture DSP 10 is used as a data path to run the accelerator function at its full potential to perform DSP algorithms such as those that require complex conjugate arithmetic functions. In modes A1 and A0, IRAM 14 is also used for data storage such that one half of the data is provided by IRAM 14 to register bank 18 via IDB and the other half of data is provided by DRAM 12 to register bank 16 via CDB. As a result of using IRAM 14 for data storage, a separate instruction control sequencing means is provided which, in modes A1 and A0, take advantage of the repetitive nature of the DSP algorithms. As will be described in more detail below, instruction control sequencing is performed with op code registers 50, an IRAM base address register 52 (16 bits), a DRAM base address register 54 (16 bits) and a configuration register 56 (16 bits) which contains a loop count, accelerator op count and IRAM modulo mask.

In mode A1 for algorithms that require complex numbers both real and imaginary coefficients are stored in IRAM 14 while real and imaginary data are stored in DRAM 12. In mode A0 real coefficients and real data are stored in DRAM 12 while imaginary coefficients and imaginary data are stored in IRAM 14. In mode NA, IRAM 14 is conventionally used to perform instructions and DRAM 12 is used for data storage and transfer.

Referring to FIG. 5, a description of IRAM 14 data transfer to IDB will now be described in accelerate modes A1 and A0. When the Load_Decode control signal is active, a base IRAM address is loaded into ARIB 52 from the CDB on the next system clock (SYSCLK) pulse after Load_Decode goes active. The base IRAM address is gated to IAB through multiplexer 57 and instruction address register (IAR) 58 after the leading edge of the next clock cycle after ACL_BEGIN_LTH goes active. IAR register 58 is used to gate the address of the instruction to be fetched from instruction memory 14. The data at the IRAM location specified by the base address is then supplied from IRAM 14 onto IDB and transferred to a register in bank 18 via multiplexer 22. On all subsequent cycles the IAB is auto incremented normally by add register 59. If auto incrementation is not used the address on IAB will remain the same until incremented.

A description of instruction control sequencing for accelerate modes (A1 and A0) will now be described. The above mentioned simplex operations (up to six) executed in one cycle represent one "complex" operation. Up to seven of these complex operations can be coded into instructions in any arrangement to form one element. Since the DSP algorithms are repetitive they can be constructed with a loop or repetitive execution of these elements. This mode uses special hardware assisted looping control where IRAM 14 is used as a data RAM and instruction control sequencing is performed as described below.

Up to seven op code registers 50 are used to store the instruction op codes which are to be executed in a loop. A configuration register 56 is coupled to op code register sequence logic 60 and contains information relating to the number of op code registers 50 needed for one loop and the number of times the loop is to be repeated. The configuration register 56 is comprised of 16 bits and contains a loop count, accelerator op count and IRAM modulo mask. In accelerate mode multiplexer 62 is controlled by control signal ACL BEGIN to provide the op codes from op code registers 50 to instruction decode logic 64 and execute registers 66 which will generate the control signals needed to execute the instruction specified by the particular op code. In addition, the execute registers 66 provide the control information needed to control accelerator 10 based on what function the current op code specified. The op codes are also provided to index decode logic 63 and branch decode logic 65 to pre-calculate any indexing and branching offsets due to the current decode which involve pipelined conditional instructions.

Figure 7:
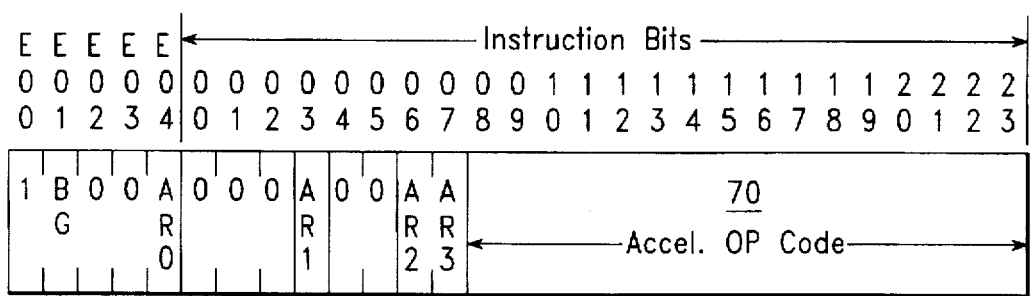
FIG. 7 shows the bit content of an instruction used to instruct the system of FIGS. 1, 5 and 6 to load any one of the seven op code registers 50, the ARDB register 54, the ARIB register 52 or the configuration register 56 with an instruction op code, a DRAM base address, an IRAM base address or configuration information respectively.

FIG. 7 shows the bit content of an instruction 68 used to instruct the accelerator 10 to load 1) any one of the seven op code registers 50, 2) the ARDB register 54, 3) the ARIB register 52 or 4) the configuration register 56 as described below. As will be described below, depending on the value of the BG and AR bits, the 16 Bits of the op code field 70 can represent a particular op code instruction, a DRAM 12 base address, an IRAM 14 base address or configuration information and will be transferred from the CDB bus to a specified op code register 50, ARDB register 54, ARIB register 52 or the configuration register 56 respectively. The instruction 68 is supplied on the IDB bus from IRAM 14 and executed by instruction decode logic 64 and execute registers 66.

The BG bit indicates whether the instruction 68 is a load op code instruction (BG=0) or a begin accelerator (BG=1) instruction. When the instruction is a load op code instruction, bits AR0–AR3 are used to specify which of the four types of loads described above is to be performed as shown in the accompanying table in FIG. 7. For example, when AR=0010, op code register 2 is loaded with the 16 op code field bits 70. When the instruction is a begin accelerator instruction the accelerator 10 will operate as described below.

Figure 8:
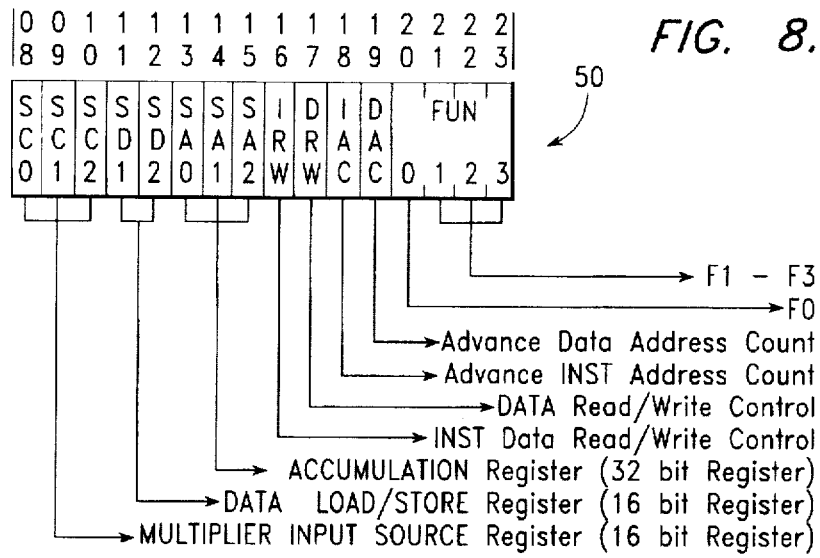
FIG. 8 shows the contents of an op code register 50 of FIG. 5.

FIG. 8 shows the contents of an op code register 50 along with the significance of each bit in register 50. The first three bits specify which of the registers in bank 16 is the multiplier input register R@SC and which corresponding register in bank 18 is the multiplier input register R@SCp. The next two bits specify the data load/store registers R@SD and R@SDp. The next three bits specify the 32 bit accumulation register R@SA. It should be noted that in order to reduce the number of bits needed in op code register 50, only two bits are required to specify the R@SD register. The complement of bit SA0 along with bits SD1 and SD2 are used to determine the R@SD register. Accordingly, the registers used for R@SD must be in the opposite bank as the registers used in R@SA. For example, if SA specifies R4W–R7W then SD has to specify R0W–R3W.

The last four bits in op code register 50 are the FUN bits (F0–F3) and are used along with a mode bit (FIG. 9) to specify a particular ALU and a particular multiplier operation as shown in FIGS. 3 and 4. The Advance Data Address Count and Advance INST Address Count are used to specify whether or not auto incrementation is to be used for the ARDB 54 or ARIB register 52 respectively. Data Read/Write Control bit specifies whether data is to be read from or written to register R@SD from data RAM 12. INST Data Read/Write control specifies whether data is to be read from or written to register R@SDp from IRAM 14.

Figure 9:
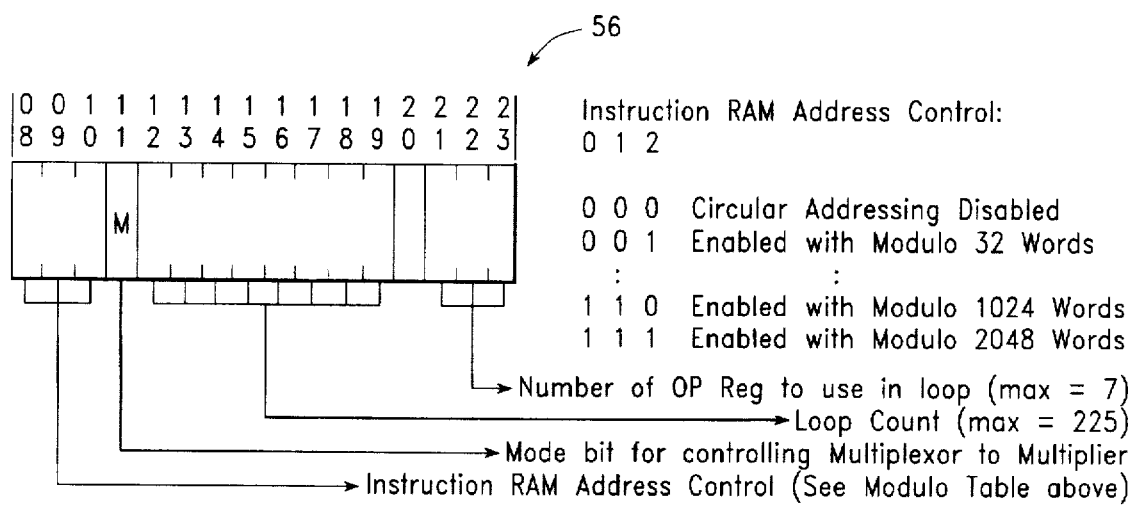
FIG. 9 shows the contents of the configuration register 70 of FIG. 5.

FIG. 9 shows the configuration register 56 along with its contents. Bits 0–2 are encoded mask bits for modulo IRAM addressing. The various states of these three bits along with the type of modulo addressing is also shown in FIG. 9. These three bits are supplied to the instruction address multiplexer 57 as shown by block 72 in FIG. 5. In modulo addressing, i.e., circular addressing, the resultant address is contained in a segment of memory 2 to the nth power in size for modulo n addressing. Bit 3 is a mode bit (M) for switching between modes A0 and A1 and is used with the F0 bit to control logic block 28 to perform the multiplier operations shown in FIG. 4. Bits 4–11 form the loop count (maximum=255) i.e., the number of times that the instructions loaded in the op code registers 50 will be performed. Bit 12 is unused and Bits 13–15 contains the number of op code registers 50 (number of instructions in the loop) to use in a loop (maximum=7). The architecture allows for an instruction loop of anywhere from two to seven instructions. For DRAM 12 masking, the bits are in the processors Machine Control Register (MCRH) (not shown) bits 13–15.

In normal or non-accelerate mode, IRAM 14 is not used for data storage but rather is used to store the instruction op codes. In addition, the op code registers 50 and configuration register 56 are not used in this mode. In normal mode, multiplexer 57 selects the next instruction address to be sent to IRAM 14. Control signals (CS) are used to control multiplexer 57 to select the next instruction address from one of the 16 bit buses CDB, ILR, ADGEN or INT_ADDR. This instruction address is then gated to IAB via IAR register 58 and IRAM 14 will provide this op code onto IDB. The op code specified by this address in IRAM 14 is then latched through multiplexer 62, decoded by logic 64 and set bits in execute registers 66. Control signals BEGIN_ACCEL_SEQ, ACL_BEGIN, ACL_BEGIN_LTH and GATE_ILR_IAB are used only in accelerate modes (1 and 0) and are normally off.

Referring to FIG. 6, a description of DRAM 12 data transfer to CDB will now be described in accelerate modes (A1 and A0). Address generation adder 76 and register 78 together make up the CAB logic. Multiplexers 80 and 82 and address register 54 are added to the common address bus gating logic to accommodate the DSP accelerator 10. When the Load_Decode control signal is active, a base DRAM address is loaded into ARDB 68 from the CDB on the next SYSCLK edge. Once ACL_BEGIN_LTH is active, register 54 is gated to CAB through multiplexer 80 and register 78. The data at the DRAM location specified by the base address is then supplied from DRAM 12 onto CDB and transferred to a register in bank 16 or 16 via multiplexers 20 or 22.

Thereafter CAB will be generated from the combination of register 78, address adder 76, multiplexer 82 and index register multiplexer 84. Multiplexer 84 will select CAB (current address) and multiplexer 82 will select 2. BEGIN_ACCEL_SEQ is a control signal used to gate the current address through adder 76 which will increment the current address by 2. The incremented address is then transferred to register 78 and onto CAB. If auto incrementation is not used the address on CAB will remain the same until incremented. DRAM MODULO SELECT is used to control the result of DRAM address sequencing. The IDR input to multiplexer 82 is defined as the Instruction Data Register which contains the immediate field for Add Immediate operations.

In normal or non-accelerate mode, ARDB 54 and multiplexer 82 are not used. In this mode, data addresses are conventionally generated from CAB selected by multiplexer 84, adder 76 and register 78. Multiplexer 80 always selects adder 76 in normal operation.

Referring back to FIG. 2, for modes A1 and A0 of the first embodiment just described, the notation MEM1(BAR1) should be replaced with DRAM(ARDB) and MEM2(BAR2) should be replace with IRAM(ARIB). This indicates that in one cycle data is transferred between a register R@SD in bank 16 and a DRAM 12 memory location as specified by DRAM base address register ARDB 54 and data is transferred between a register R@SDp in bank 18 and an IRAM 14 memory location as specified by IRAM base address register ARIB 52.

Figure 11A:
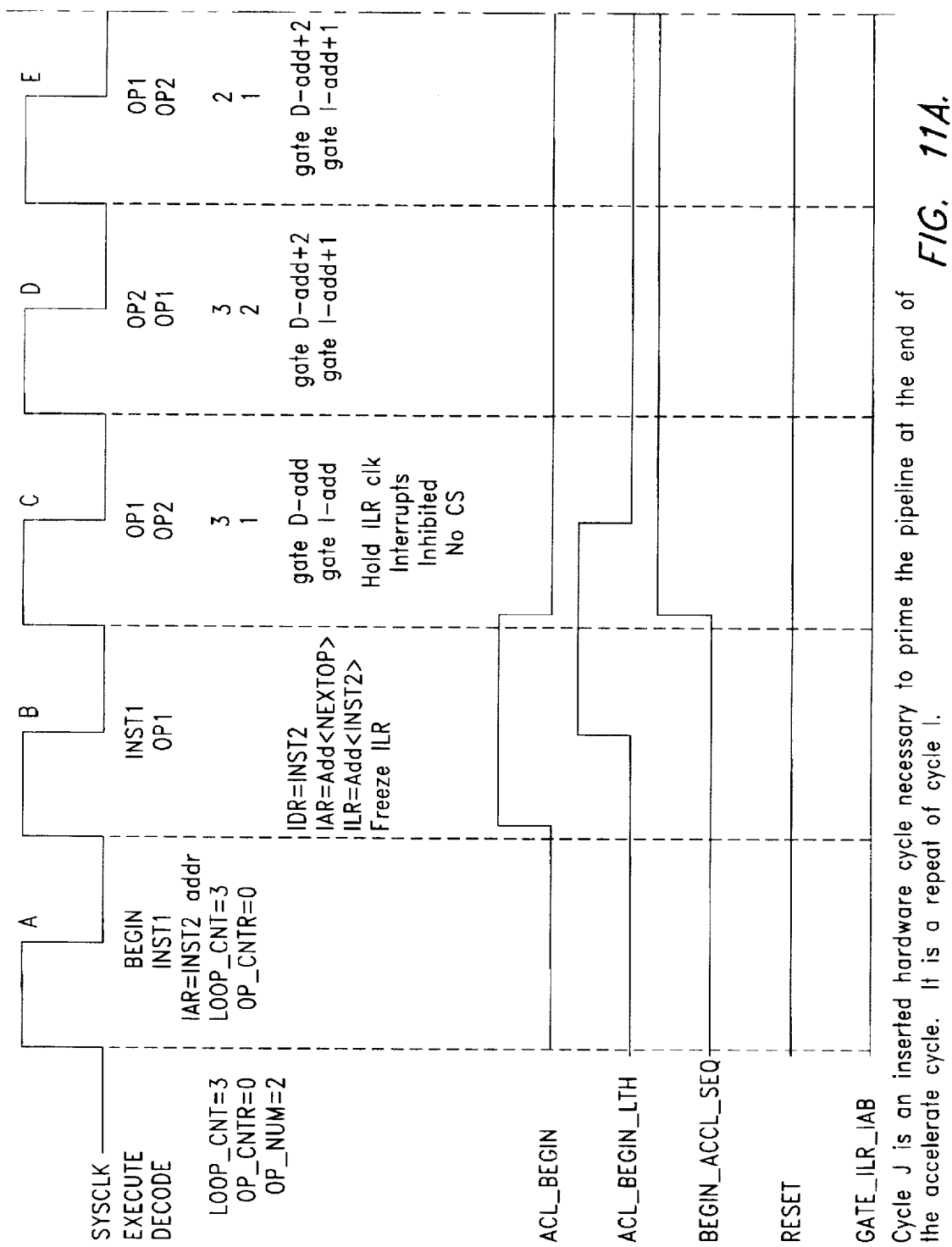
FIG. 11 shows a cycle timing diagram for the example of FIG. 10.

As an example of the operation of accelerator 10 in accelerate mode (1 or 0), FIGS. 10 and 11 show a pseudo code and cycle timing diagram for a two instruction operation with a loop count of three. As shown in FIG. 10, the accelerator 10 is started by loading the I RAM base address register 52 and the DRAM base address register 54 with their respective base addresses. As described above, when a load of ARIB 52 is decoded the CDB containing the load value will be loaded into ARIB 52 on the next SYSCLK pulse. Similarly, on a load/decode, ARDB register 54 is loaded on the next SYSCLK clock edge. Next, two op code registers (RB2 and RB3) are loaded with their respective op code instructions. Since this example is for a two instruction cycle, two op code registers are used. The loop count(=3) and op count (=2) are then loaded into configuration register 56. Each of the above steps occur before clock cycle A in FIG. 11.

As shown in FIG. 11, the accelerator 10 is begun (cycle B) after the ACL BEGIN control signal is generated by executing an ACL BEGIN instruction. ACL_BEGIN_LTH is a one cycle pulse which is activated prior to the first instruction of the first loop. When ACL_BEGIN_LTH is driven active (cycle B), the ARIB 52 output will be gated to IAB and simultaneously the ARDB register 54 output will be gated to CAB after the leading edge of the next clock cycle (cycle C). Thereafter IAB is auto incremented normally by bit B1 59 and CAB will be generated (auto incremented) from the combination of register 78, address adder 76 and multiplexers 82 and 84. During cycle C, the first instruction of accelerator 10 is executed and BEGIN_ACCEL_SEQ is activated for the duration of accelerate mode operation.

Operation and execution of instructions proceed with the loop count (bits 4–11 in configuration register 56) being decremented after each loop and the op counter (bits 13–15 in configuration register 56) repetitively keeping track of the instructions executed in each loop. The accelerator 10 will continue to execute the instructions in the op code registers until the loop count reaches zero. It should be noted that once the accelerator 10 is started it can only be stopped by a normal completion (loop count=0), power on reset or by a parity error. At the end of the loop GATE_ILR_IAB is generated for one cycle and the ILR output of register 74 is gated to IAB allowing the accelerator 10 to continue normal code sequencing (non-accelerate mode). The RESET signal is used to indicate that the accelerator 10 is to switch from accelerate mode to normal mode. An advantage of switching between accelerate and normal modes is that the accelerator 10 is more versatile in the functions and algorithms that it can perform and the accelerator modes are conveniently initialized in normal mode.

By utilizing first and second data memories 12, 14, two multipliers 24, 26 and a three input ALU 42, the system 10 of the present invention can simultaneously perform up to six simplex operations in parallel (two memory loads/stores, two multiplications and two ALU operations) during one operating cycle thereby reducing the number of cycles needed to obtain a sample value and increasing efficiency. This feature coupled with the ability to program any combination of the simplex operations described above allows the DSP system 10 of the present invention to compute sample values for a wide range of algorithms and to perform them more efficiently than any prior art DSP system. In addition, the use of op code instructions in op code registers along with a repetitive loop of the instructions decreases the amount of memory needed for instructions and reduces the MIPS requirement of the repetitive execution of identical code.

Figure 12:
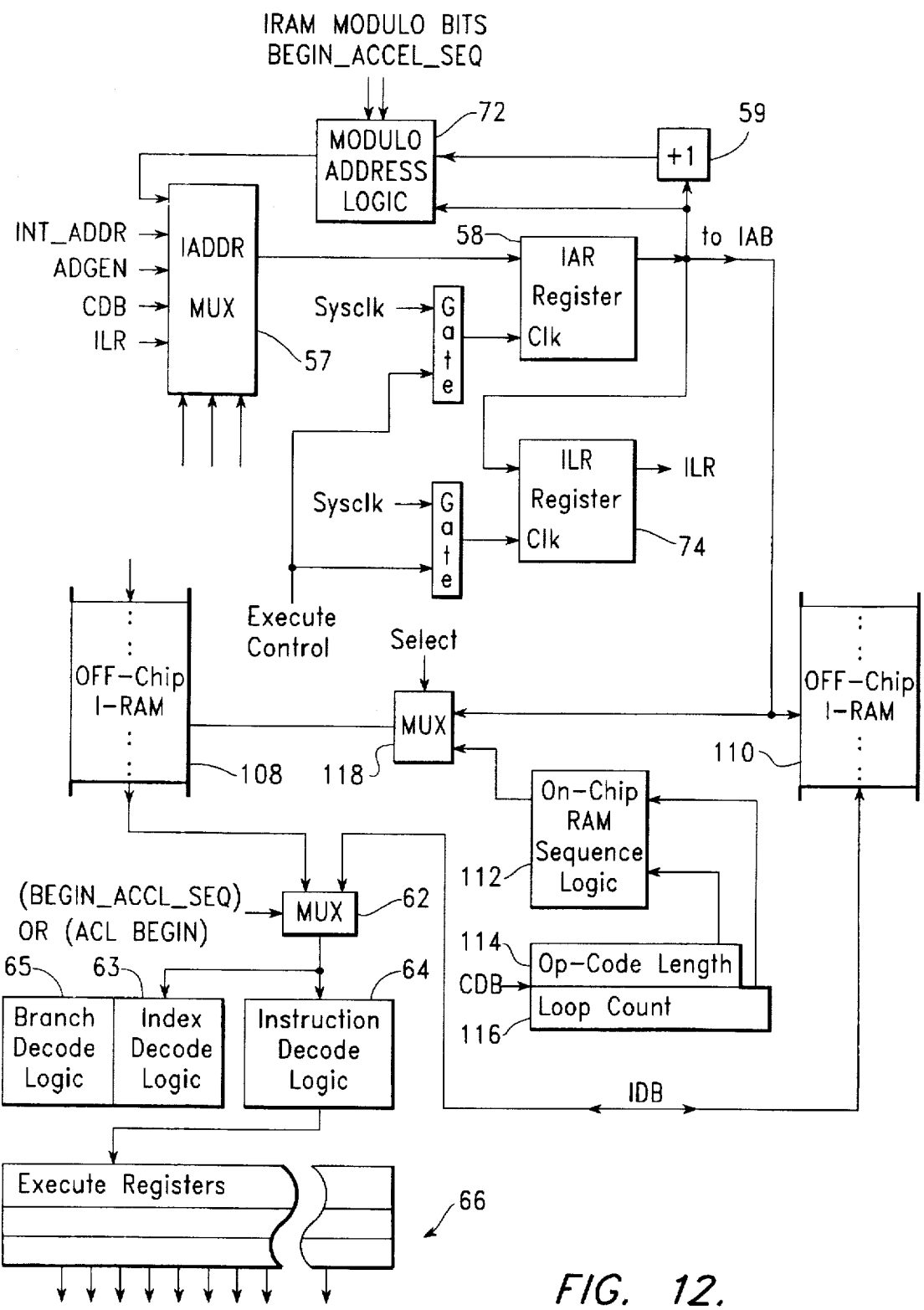
FIG. 12 is a schematic diagram of instruction control sequencing for a second embodiment of the present invention.
Figure 13:
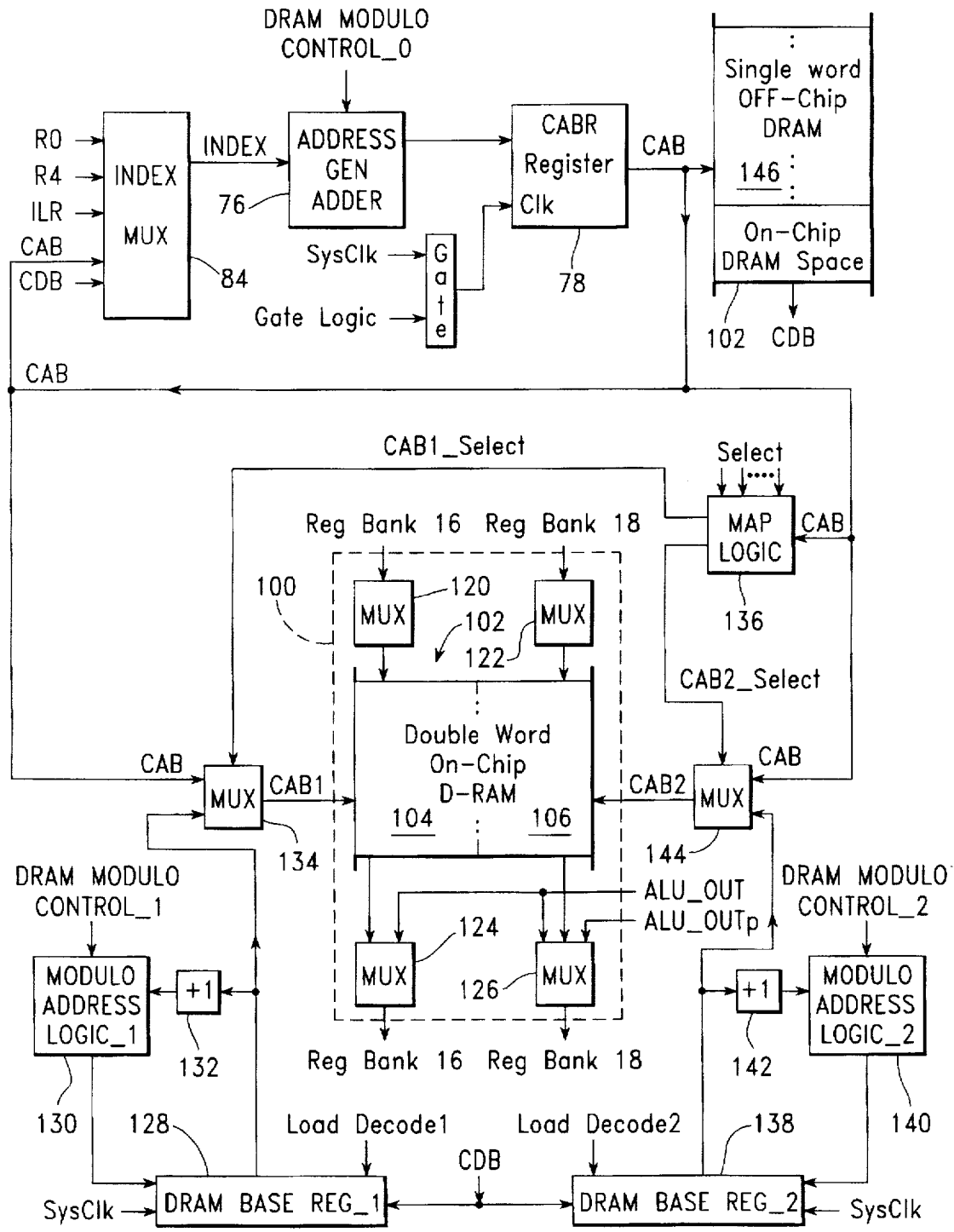
FIG. 13 is a schematic diagram of data RAM addressing for the second embodiment.

Referring now to FIGS. 1, 12 and 13, there are shown schematic diagrams of memory data addressing and instruction control sequencing for a second embodiment of the DSP 10 of the present invention. For this embodiment, all the elements of FIG. 1 are the same and operate in the same manner as that described above for the first embodiment except that block 19 of FIG. 1 is replaced with block 100 of FIG. 13 and the memory data addressing and instruction control sequencing of FIGS. 5 and 6 are replaced with that shown in FIGS. 12 and 13. In this embodiment, the accelerator 10 can also operate in one of the three modes described above (modes A1, A0 and NA). In addition, accelerator algorithms can be performed with or without looping.

In this embodiment, DRAM 102 is split into to two segments, DRAM1 104 and DRAM2 106, and is used to store all data and coefficients. A first plurality of data values can be stored in DRAM1 104 and a second plurality of data values can be stored in DRAM2 106. There are two IRAMs, one on chip 108 and one off chip 110. The off chip IRAM 110 is the normal non-accelerate IRAM and operates in the same manner as IRAM 14 of FIG. 5 in mode NA. However, the on chip IRAM 108 replaces the op code registers of FIG. 5 to contain the accelerate op codes and on-chip sequence logic 112, op code length 114 and loop count 116 replace the configuration register 56 of FIG. 5.

In mode A1 for algorithms that require complex numbers both real and imaginary coefficients are stored in DRAM2 106 while real and imaginary data are stored in DRAM1 104. In mode A0 real coefficients and real data are stored in DRAM2 106 while imaginary coefficients and imaginary data are stored in DRAM1 104.

As mentioned above, since the DSP algorithms are repetitive they can be constructed with a loop or repetitive execution of the above mentioned simplex operations. Instruction control sequencing for this embodiment in modes A1 and A0 uses a special LOOPZ (loop until zero) type of op code to perform looping on a segment of instructions. The execution of the LOOPZ op code within on chip IRAM 108 executes the next N accelerate instructions until a specified register is zero. This looping is controlled by on chip RAM sequence logic 112 using op code length 114 and loop count 116 supplied from register 56 on the CDB bus. On chip IRAM 108 replaces the op code registers of FIG. 5 to contain the accelerate op codes and on-chip sequence logic 112, op code length 114 and loop count 116 replace the configuration register 56 of FIG. 5. Multiplexer 118 is used to select between logic 112 to loop through the specified code segment in accelerate modes. Multiplexer 62 is used to select instructions from on chip IRAM 108 and transfer them to execute registers 66.

On chip IRAM 108, on-chip sequence logic 112, op code length 114 and loop count 116 are used to repetitively execute up to seven op codes in the same manner as accelerate registers 50 and configuration register 56 of the first embodiment. Anywhere from two to seven op code instructions are stored in IRAM 108 and the number of op codes are specified by op code length 114. The number of loops to be performed are specified by loop count 116. In operation, sequence logic 112 will control the specified number of op codes in IRAM 108 to be executed sequentially and repetitively until the loop count reaches 0.

Alternatively, this embodiment can perform the DSP algorithms in modes A1 and A0 without looping. This is accomplished by storing all the op codes in either on chip IRAM 108 or off chip IRAM 110. If on chip IRAM 108 is used, multiplexer 118 will select the address on IAB to address the op code instructions in IRAM 108 and multiplexer 62 will select IRAM 108 to supply the op code instructions to execute registers 66. If off chip IRAM 110 is used, the op codes are again addressed from IAB as generated by IAR register 58 but multiplexer 62 will select IDB to supply the op code instructions from IRAM 110 to execute registers 66.

In normal or non accelerate mode, off chip IRAM 110 is used and multiplexer 62 will select IDB to supply the op code instructions from off chip IRAM 110 to execute registers 66. Elements 57, 58, 59, 72 and 74 operate as described above with regard to the normal mode for the first embodiment of FIG. 5.

Referring to FIG. 13, a description of DRAM addressing in accelerate modes A1 and A0 for this embodiment will now be described. Address generation adder 76 and register 78 together make up the CAB logic. In modes A1 and A0, one half of the data is provided by DRAM1 104 to register bank 16 via multiplexer 124 and the other half of data is provided by DRAM2 106 to register bank 18 via multiplexer 126. Data can also be transferred from a register in bank 16 to DRAM1 104 via multiplexer 120 and data can be transferred from a register in bank 18 to DRAM2 106 via multiplexer 122. Each segment 104 and 106 has its own independent address generating mechanism. More specifically, segment 104 has its own DRAM base register 128 and modulo address logic 130 which includes an increment by 1 circuit 132. A base DRAM address is loaded into the DRAM base register 128 from the CDB. The address supplied to the first segment 104 on CAB1 can be the address on CAB or the address specified by register 128. The selection, is made by multiplexer 134 through control line CAB1_Select which is generated by map logic device 136. The map logic device 136 is used to access on chip DRAM 102.

Similarly, segment 106 independently operates in the same manner with base register 138, modulo address logic 140, increment circuit 142, multiplexer 144 and CAB2_Select. The use of two DRAM base address registers 128 and 138 with independent modulo control 130 and 140 respectively allows the accelerator 10 independent access to each memory half 104 and 106 respectively. For example, data can be stored in one half while coefficients are stored in the other half of on chip DRAM 102. In addition, if there is not enough on chip DRAM available off chip DRAM 146 can be used. Off chip DRAM 146 is coupled to the common address bus CAB and the common data bus CDB and is conventionally addressed. Data is transferred to register banks 16 and 18 from off chip RAM 146 via CDB.

Referring back to FIG. 2, for modes A1 and A0 of this embodiment, the notation MEM1(BAR1) should be replaced with DRAM1(ARDB1) and MEM2(BAR2) should be replace with DRAM2(ARDB2). This indicates that in one cycle data is transferred between a register R@SD in bank 16 and a DRAM1 104 memory location as specified by DRAM base address register ARDB1 128 and data is transferred between a register R@SDp in bank 18 and an DRAM2 106 memory location as specified by DRAM base address register ARDB2 138.

In operation, on the next SYSCLK edge after Load_Decode1 (or Load_Decode2) control signal goes active, a base DRAM address is loaded into register 128 (or register 138) from the ODE This base address is transferred to CAB1 (CAB2) by multiplexer 134 (or 144) and the data at the DRAM location specified by the base address is then supplied from DRAM segment 104 (106) onto CDB and transferred to a register in bank 16 (or 18) via multiplexers 20 (or 22). Thereafter the base registers 128 and 138 are independently auto incremented with modulo logic 130, increment circuit 132 and modulo logic 140 and increment circuit 142 respectively. Accordingly, the addresses supplied on CAB1 and CAB2 are incremented and data in DRAM segments 104 and 106 is accessed. If auto incrementation is not used the address on CAB1 or CAB2 will remain the same until incremented.

In normal mode, data addresses are conventionally generated from the CAB bus selected multiplexer 84, adder 76 and register 78. In addition, control signals CAB1_Select and CAB2_Select for multiplexers 134 and 144 respectively are used to select CAB to supply to CAB1 and CAB2.

To more fully understand the operation of DSP accelerator 10, a few examples of algorithms than can be performed by the accelerator 10 will now be described. The accelerator 10 of the present invention takes advantage of the fact that each of the algorithms involve multiplication/accumulation operations that are computed repetitively and cyclically. A complex convolution algorithm which fully utilizes the accelerator 10 such that all cycles perform all six simplex operations in one cycle is a equalizer implementation of the formula:

$$\vec{Y}_k = \sum_{i=0}^{N} E\vec{QZ}_i \vec{X2}_{k-i} \quad (1)$$

wherein:
x2(k) represents the kth input signal sample (also referred to as a "Timing 2" buffer) which is being initially sampled at a rate f=1/T where T is a predefined time period.
y(k) are output signal sample values provided by the filter.
eqz(I) are the "coefficients" defining the filtering function to be achieved with a predefined filter of length N.

Equation (1) is adapted from the MWAVE V.32 task. As an example let's assume the operations of equation (1) are to be performed using 32 coefficients (N=31) and to simplify writing the output sample y(k)=yr(k)+jyi(k) let's replace x2 with "x" and eqz with "h". The output sample to be computed would be:

yr(k)=hr(0)xr(k-0)−hi(0)xi(k-0)+hr(1)xr(k-1)−hi(1)xi(k-1)+ . . . +hr(31)xr(k-31)xi(k-31).

yi(k)=hr(0)xi(k-0)+hi(0)xr(k-0)+hr(1)xi(k-1)+hi(1)xr(k-1)+ . . . +hr(31)xi(k-31)+hi(31)xr(k-31).

where "r" indicates the real part and "i" indicates the imaginary part.

FIG. 14 shows the program language used to program the accelerator 10 to perform equation (1) in accelerate mode 1 using the first embodiment (real and imaginary coefficients are stored in IRAM 14 and real and imaginary data are stored in DRAM 12). First, the DRAM 12 data base address is loaded into ARDB register 54 and the IRAM 14 coefficient address is loaded into ARIB register 52. Next, four of the op code registers 50 are loaded with instruction op codes. For example, the first op code register (AR0) is loaded with an op code that will perform the following operations during one clock cycle of operation: 1) Load R1 with data value at memory location in DRAM 12 specified by ARDB 54 and auto increment ARDB, 2) Load R1p with coefficient value at memory location in IRAM 50 specified by ARIB 52 and auto increment ARIB, 3) add the values in R6W with the values in RM and RMp and store the result in R6W, 4) Multiply the value in R5 with R5p (both from the previous cycle) and transfer product result to RM and 5) Multiply the value in R0 with R0p (both from the previous cycle) and transfer product result to RMp.

The configuration register 56 (ARCN) is then loaded with an op count length of 4, a loop length of 17 and circular addressing is disabled for IRAM 14 since auto incrementation is used. Next, the registers used are initialized. The registers used to receive data from IRAM 14 and DRAM 12 (R0W, R1W and R5W) are set to 0 and the registers used for accumulations (R2W and R6W) are set to a constant and for rounding. The accelerator is then begun with ACL BEGIN as described above and RM and RMp are initialized.

Turning now to the table in FIG. 15, there is shown the timing (one line per cycle) of the operations performed by accelerator 10 to obtain the samples result y(k) of equation (1) for a filter length of 32 in mode A1. It should be noted that due to pipelining, 2 zero values must be appended to the filter coefficients. The notations in FIG. 15 bear the following meanings:

Rn=0(ARDB+)→load Rn with data (x(k-i) sample) from DRAM 12 address specified in ARDB 54 and automatically increment ARDB 54 to next DRAM address corresponding to next data sample.

Rnp=0(ARIB+)→load Rnp with data (coefficient) from IRAM 14 address specified in ARIB 52 and automatically increment ARIB 52 to next IRAM address corresponding to next coefficient data value.

RnW=RnW+RM+RMp→Add contents of concatenated registers Rn/Rnp with registers RM and RMp and store result in Rn/Rnp.

RM(Ra*Rbp) (a can equal b)→Multiply contents of Ra with Rbp (both from previous cycle) and store result in RM.

RMp(Rc*Rdp) (c can equal d)→Multiply contents of Rc with Rdp (both from previous cycle) and store result in RMp.

( ) around an entire operation indicates pipelining overhead, i.e., operations that must be coded in the loop but do not perform any function.

Referring to the table in FIG. 15, it can be seen that all samples x(k-0) through x(k-31) (real and imaginary) are loaded into registers R1, R5 and R0 from DRAM 12 while all coefficients h(0) through h(31) (real and imaginary) are loaded into registers R1 p, R5p and R0p from IRAM 14 depending on the particular cycle. In addition, the table shows that R2W is used to accumulate the real part of y(k) while R6W is used to accumulate the imaginary part of y(k). To simplify the data flow table of FIG. 11, we have replaced each intermediate sum in R2W with X0r, X1r, X2r, etc. and replaced each intermediate sum in R6W with X0i, X1i, X2i, etc.

For example, the flow chart indication at cycle 5 of R1=(ARDB+), R1p=(ARIB+), R6W=R6W+RM+RMp, R5*R5p and R0*R0p means xr(k-2) is loaded into R1, hr(2)

is loaded into R1 p while ARDB 54 and ARIB 52 are automatically incremented, the contents of RM and RMp (both from the previous cycle are added to R6W (i.e., hi(0)*xr(k-0) is added to hr(0)*xi(k-0)), R5 is multiplied with R5p (both from cycle 2) and result stored in RM and R0 is multiplied with R0p (both from cycle 2) and result stored in RMp. In cycle 4 it is shown that R2W will contain the sum of the first two real terms in yr(k) and in cycle 5 R6W will contain the sum of the first two imaginary terms in yi(k). The data flow table of FIG. 15 shows that the kth value y(k) for a filter length of 32 will be available from R2W and R6W after the 67th cycle.

Since all of the algorithms that will be described herein consist of summations, Efficiency E will be defined as the number of summations per instruction cycle and can be used as a performance measurement. As can be seen from the data flow table of FIG. 15, four sums in two cycles can be performed resulting in an efficiency E of 2.00. It can be seen from the data flow table that the addressing scheme of the first embodiment can be implemented with 4 op code registers (op count of 4) and a loop count of 17.

It should be noted that R2W and R6W are exemplary only and any of registers R0W through R7W (except R5W) could have been used. In addition, the accelerator 10 can perform equation (1) for any number N up to 508 coefficients, (i.e., 0≦N≦507).

It should be further noted that without the accelerator 10 of the present invention equation (1) would be performed with only one load/store, one add and one multiplication can be performed in one operating cycle. Accordingly, it would take twice as many cycles to compute a sample y(k) for equation (1) without the accelerator 10 (only two sums in two cycles resulting in an E of 1.00).

Turning now to the table in FIG. 16, there is shown the timing (one line per cycle) of the operations performed by accelerator 10 to obtain the sample result y(k) of equation (1) for a filter length of 32 in accelerate mode 0 (imaginary coefficients and samples are stored in IRAM 14 and real coefficients and samples are stored in DRAM 12). As shown in FIG. 16, although the same registers as in FIG. 15 are used, they are arranged in different orders to accommodate mode A0 operation. It can be seen that all real samples xr(k-0) through xr(k-31) and real coefficients hr1-hr31 are loaded into registers R1, R5 and R0 from DRAM 12 while all imaginary samples xi(k-0) through xi(k-31) and imaginary coefficients hi(0) through hi(31) are loaded into registers R1p, R5p and R0p from IRAM 14 respectively depending on the particular cycle.

The contents of R2W and R6W in FIG. 16 will be exactly the same as that shown in FIG. 15 and thus to simplify in writing the contents of R2W and R6W in FIG. 16 we have used the notation X0r, X1r, ... X31 r for R2W and X0i, X1i, ... X31i for R6W. R2W is again used to accumulate the real part of y(k) while R6W is again used to accumulate the imaginary part of y(k). For example, in cycle 5 of FIG. 16, hr(2) is loaded into R1, hi(2) is loaded into R1p while ARDB 54 and ARIB 52 are automatically incremented, the contents of RM and RMp (both from the previous cycle are added to R6W (i.e., hr(0)*xi(k-0) is added to hi(0)*xr(k-0)), R1 is multiplied with R5 (both from cycle 2) and result stored in RM and R1 p is multiplied with R5p (both from cycle 2) and result stored in RMp.

The data flow table of FIG. 16 shows that the kth value y(k) will be available from R2W and R6W after the 67th cycle. As also can be seen from the data flow table, four sums in two cycles can be performed resulting in an efficiency E of 2.00. It can further be seen from the table in FIG. 16 that the addressing scheme of the first embodiment can be implemented with 4 op code registers (op count of 4) and a loop count of 17.

By comparing the tables in FIGS. 15 and 16 it can be seen that the same number of registers, same number of cycles and same number of operations are needed to get the final y(k) result. Thus, the efficiency of accelerator 10 is the same whether it's in mode A1 or A0 and the choice between the two is only a matter of personal preference.

It should be noted that equation (1) could have also been performed with the second embodiment of the present invention using the memory data addressing and instruction control sequencing of FIGS. 12 and 13. The data flow tables using the second embodiment would be the same as that shown in FIGS. 15 and 16 except that "ARDB" 54 would be replaced with "ARDB1" 128 and "ARIB" 52 would be replaced with "ARDB2" 138 indicating that the data and coefficient values would be supplied from DRAM1 104 and DRAM2 106 instead of DRAM 12 and IRAM 14 and instruction control sequencing would be controlled as described above with regard to FIGS. 12 and 13 for the second embodiment.

Another example of an algorithm which can be performed with the accelerator 10 is called zipping. This example will further show the flexibility of the operations and instruction looping that can be performed by accelerator 10. When this algorithm is performed with the accelerator 10, only some of the cycles will perform all six simplex operations and auto incrementing is not used for every cycle.

The zip technique is based on the concurrent computation of two consecutive results of these correlation products:

$$y_k = \sum_{l=0}^{N} h_l x_{k-l} \qquad y_{k+1} = \sum_{l=0}^{N} h_l x_{k-l+1} \qquad (2) \text{ and } (3)$$

As an example let's assume the operations of equations (2) and (3) are to be performed using 32 coefficients (N=31) in mode A1. The output sample to be computed for k=1 would be:

$y0 = h0 \times 0 + h1 \times 1 + h2 \times 2 \ldots + h31 \times 31$.

$y1 = h0 \times 1 + h1 \times 2 + h2 \times 3 \ldots + h31 \times 32$.

The table in FIG. 17 shows the timing (one line per cycle) of the operations performed by accelerator 10 in mode A1 using the first embodiment to obtain the samples result y0 and y1. The notations in FIG. 17 bear the following meanings:

Rn=(ARDB+)→load Rn with data (xn sample) from DRAM 12 address specified in ARDB 54 and automatically increment ARDB 54 to the next DRAM address corresponding to next data sample. (If there is no+sign ARDB 54 is not incremented to next DRAM 12 memory location.)

Rnp=(ARIB+)→load Rnp with data (coefficient) from IRAM 14 address specified in ARIB 52 and automatically increment ARIB 52 to next IRAM address corresponding to next coefficient data value.

SPARE=Rnp+→load current data of Rnp into spare memory location in IRAM and automatically increment ARIB (ARDB) to next IRAM (DRAM) address corresponding to next coefficient data value. This is needed to retain the coefficient in Rnp from two previous cycles and to provide a dummy operation for the DSP 10.

snop→no operation performed

RnW=RnW+RM+RMp→Add contents of concatenated registers Rn/Rnp with registers RM and RMp and store result in Rn/Rnp.

RM(Ra*Rbp) (a can equal b)→Multiply contents of Ra with Rbp (both from previous cycle) and store result in RM.

RMp(Rc*Rdp) (c can equal d)→Multiply contents of Rc with Rdp (both from previous cycle) and store result in RMp.

Referring to the table in FIG. 17, it can be seen that in mode A1 all samples x0-x31 are loaded into registers R1 and R5 from DRAM 12 while all coefficients h0-h31 are loaded into registers R1p and R5p respectively from IRAM 14 depending on the particular cycle. In addition, the table shows that R2W is used to accumulate the y0 result while R6W is used to accumulate the y1 result. In addition, to simplify the flow table of FIG. 17, we have replaced each intermediate sum in R2W with A1, A2, A3, etc. and replaced each intermediate sum in R6W with B1, B2, B3, etc.

For example, the flow chart indication at cycle 3 of R1=(ARDB), (ARIB+)=R1 p, snop, R5*R5p and R1*R1 p means x2 is loaded into R1, h0 is loaded into spare memory location and R1p still contains h0 while ARIB 52 is automatically incremented, no add operation, R5 is multiplied R5p (both from cycle 2) and result stored in RM and R1 is multiplied with R1p (both from cycle 2) and result stored in RMp. In cycle 4 it is shown that R2W will contain the sum of RM and RMp of cycle 3 which are the first two terms in y0. In addition, cycle 4 performs all six simplex operations. In cycle 5 R6W will contain the sum of RM and RMp from cycle 4 which are the first two terms in y1.

The data flow table shows that using the zip technique, the next output sample, y1 is being constructed to be made available from R6W one operating cycle after y0 is made available in R2W (49th and 50th cycles respectively). As can be seen from the data flow table in FIG. 17, four sums in three cycles can be per, formed resulting in an efficiency E of 1.33. The efficiency for equations (2) and (3) are less than that of equation (1) because in every cycle of operation of equation (1) two sums are computed while in equations (2) and (3), four sums are performed in three cycles.

It can be seen from the table in FIG. 17 that the addressing scheme of the first embodiment can be implemented with 3 op code registers (op count of 3) and a loop count of 17.

It should be noted that R2W and R6W are exemplary only and any of registers R0W through R7W (except R5W) could have been used. In addition, the accelerator 10 can perform equations (2) and (3) for any number N up to 254 coefficients, (i.e., $0 \leq N \leq 253$).

It should be noted that equations (2) and (3) could have also been performed with the second embodiment of the present invention using the memory data addressing and instruction control sequencing of FIGS. 12 and 13. The data flow table using the second embodiment would be the same as that shown in FIG. 17 except that "ARDB" 54 would be replaced with "ARDB1" 128 and "ARIB" 52 would be replaced with "ARDB2" 138 indicating that the data and coefficient values would be supplied from DRAM1 104 and DRAM2 106 instead of DRAM 12 and IRAM 14 and instruction control sequencing would be controlled as described above with regard to FIGS. 12 and 13 for the second embodiment.

The accelerator 10 of the present invention can be programmed to compute sample values for many other DSP algorithms including but not limited to the following: Hilbert Filtering of the form:

$$Y_k = \sum_{l=0}^{N} h_l x_{k-l} \qquad Z_k = \sum_{l=0}^{N} h_{ll} x_{k-l}$$

Hilbert Zipping Filter of the form:

$$Y_k = \sum_{l=0}^{N} h_l x_{k-l} \qquad Z_k = \sum_{l=0}^{N} h_{ll} x_{k-l}$$

$$Y_{k+1} = \sum_{l=0}^{N} h_l x_{k-l+1} \qquad Z_{k+1} = \sum_{l=0}^{N} h_{ll} x_{k-l+1}$$

and simple Filtering of the form:

$$y_k = \sum_{l=0}^{N} h_l x_{k-l}$$

Any of these algorithms, just as for those described above, can be performed with either the first or second embodiments of the present invention described above and in either mode A0 or mode A1.

It should be understood by those skilled in the art of the present invention that the number of op code registers, the loop count range, the bit size of the registers used and the coefficient ranges described above are exemplary only and other sizes and ranges are possible in accordance with the teachings of the present invention. For example, the number of op code registers 50 can be any number that is small in comparison to the size of IRAM 14.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A digital signal processing system comprising:

first and second register means for processing digital data, first memory means coupled to said first register means for storing a first plurality of data values, said first memory means being operative to transfer any of said first plurality of data values between said first memory means and said first register means, second memory means coupled to said second register means for storing a second plurality of data values, said second memory means being operative to transfer any of said second plurality of data values between said second memory means and said second register means, first and second multiplier means for producing first and second product outputs respectively, each of said first and second multiplier means being coupled to said first and second register means, wherein said second multiplier means is separate from said first multiplier means, arithmetic logic means having first, second and third inputs and an output, said first input being coupled to said first product output, said second and third inputs being selectively coupled to either of said second product output and said first and second register means, said arithmetic logic means output being coupled to said first and second register means for accumulating sample values in said first and second register means, instruction control means for storing a plurality of instruction op codes and controlling said system to compute said sample values by performing simplex operations during each cycle of a plurality of operating cycles of a first digital signal processing procedure;

wherein said first plurality of data values in said first memory means are real data values and real coefficient values and said second plurality of data values in said second memory means are imaginary data values and imaginary coefficient values, and wherein said instruction op codes are programmable and operative to control said system to perform the following operations during a single operating cycle within said plurality thereof: (1) transferring a first data value within said plurality thereof from said first memory means to said first register means, (2) transferring a second data value within said plurality thereof from said second memory means to said second register means, (3) multiplying data on said first multiplier means and produce a first product output, (4) multiplying data on said second multiplier means and produce a second product output, (5) performing an arithmetic operation on said first, second, and third arithmetic logic output, and (6) transferring said arithmetic logic output to said first and second register means.

2. The system according to claim 1, wherein said first and second memory means are first and second segments of data RAM, said first and second segments being coupled to a first and a second address bus respectively.

3. The system according to claim 2, wherein said instruction op codes are programmable and operative to control said system to perform a plurality of the following simplex operational and any combination thereof during a particular instruction cycle; (1) transfer a first data value from said first segment of data RAM to said first register means, (2) transfer a second data value from said second segment of data RAM to said second register means, (3) multiply data on said first multiplier means and produce said first product output, (4) multiply data on said second multiplier means and produce said second product output, an arithmetic operation on the first and second (5) and third (6) arithmetic inputs to produce said arithmetic logic output and transfer said arithmetic logic output to said first and second register means.

4. The system according to claim 3, wherein said instruction control means is operative to control said system to perform each of the six operations during at least one of said plurality of operating cycles.

5. The system according to claim 2:
wherein said first memory means further includes a first address base register and a first modulo index device for generating first addresses on a first prime address bus corresponding to memory locations in said first segment,
wherein said second memory means further includes a second independently controllable modulo index device for generating second addresses on a second prime address bus corresponding to memory locations in said second segment; and
wherein said first and second memory means access memory locations in said first and second segments, and said instruction control means accesses an instruction op code within said plurality thereof, during a single cycle within said plurality of operating cycles.

6. The system according to claim 5, further including:
a common address bus,
first select means for coupling either one of said common address and said first prime address buses to said first address bus,
second select means for coupling either one of said common address and said second prime address buses to said second address bus, logic means coupled to said common address bus and said first and second select means for independently controlling said first and second select means to couple (1) either one of said common address bus and said first prime address bus to said first address bus and, (2) either one of said common address bus and said second prime address bus to said second address bus, respectively.

7. The system according to claim 6, further including off chip memory means coupled to said common address bus and said first and second register means for transferring data between said off chip memory means and said first and second register means.

8. The system according to claim 2, wherein said instruction control means includes on chip instruction memory means for storing said plurality of instruction op codes and instruction address generation means coupled to said on chip instruction memory means for generating addresses corresponding to memory locations in said on chip instruction memory means.

9. The system according to claim 8, further including loop control means for executing said plurality of instruction op codes in a repetitive loop until said first signal processing procedure is completed, wherein said instruction op codes in said repetitive loop are always executed in a pre-determined order during each execution thereof in said repetitive loop.

10. The system according to claim 8, wherein said loop control means includes as op code count indicating and solely determining the number of instruction op codes to be used in one loop and a loop count indicating and solely determining the number of times the selected number of instruction op codes will be executed.

11. The system according to claim 10, wherein said op code count is an integer number from two to seven and said loop count is an integer number from 2 to 255.

12. The system according to claim 9, wherein said first digital signal processing procedure corresponds to a first mode of operation and said system further includes:
off chip memory means for controlling said system to perform a second digital signal processing procedure corresponding to a second mode of operation, and
means for switching control from said on chip memory means to said off chip memory means after said first digital signal processing procedure is completed such that said system switches from said first mode to said second mode of operation.

13. The system according to claim 1, wherein:
said first memory means is a data RAM having address generation means for generating addresses corresponding to memory locations in said data RAM,
said second memory means is an instruction RAM having address generation means for generating addresses corresponding to memory locations in said instruction RAM.

14. The system according to claim 13, wherein said instruction op codes are programmable and operative to control said system to perform a plurality of the following simplex operations and any combination thereof during a particular instruction cycle; (1) transfer a first data value from said data RAM to said first register means, (2) transfer a second data value from said instruction RAM to said second register means, (3) multiply data on said first multiplier means and produce said first product output, (4) multiply data on said second multiplier means and produce said second product output, an arithmetic operation on the first and second (5) and third (6) arithmetic inputs to produce said arithmetic logic output and transfer said arithmetic logic output to said first and second register means.

15. The system according to claim 14, wherein said instruction control means is operative to control said system to perform each of the six operations during at least one of said plurality of operating cycles.

16. The system according to claim 13, wherein said instruction control means includes:

a plurality of op code resisters for storing said plurality of instruction op codes, and loop control means for controlling said plurality of op codes in said plurality of op code registers to be executed in a repetitive loop until said first digital signal processing procedure is completed, said loop control means including a programmable configuration register for storing an op code count indicating the number of op code registers to be used in one loop and a loop count indicating the number of times the plurality of op codes will be executed, wherein said op codes in said repetitive loop are always executed in a pre-determined order during each execution thereof in said repetitive loop during said first signal processing procedure.

17. The system according to claim 16, further including:

first sequential transfer means for sequentially transferring said first data values from adjacent memory locations in said data RAM to said first register means, second sequential transfer means for sequentially transferring said second data values from adjacent memory locations in said instruction RAM to said second register means.

18. The system according to claim 17, wherein:

said data RAM address generation means includes a first base address register for storing addresses corresponding to memory locations in said data RAM, said instruction RAM address generation means includes a second base address register for storing addresses corresponding to memory locations in said instruction RAM, said first sequential transfer means includes means for independently auto incrementing said first base address register such that said first data values will be sequentially transferred from adjacent memory locations in said data RAM to said first register means as said system cycles through each instruction in the loop, and said second sequential transfer means includes means for independently auto incrementing said second base address register such that said second data values will be sequentially transferred from adjacent memory locations in said instruction RAM to said second register means as said system cycles through each instruction in the loop.

19. The system according to claim 17, wherein said op code count is an integer number from two to seven and said loop count is an integer number from 2 to 255.

20. The system according to claim 13, wherein said first digital signal processing procedure corresponds to a first mode of operation and said instruction RAM is operative to store a plurality of instructions for controlling said system to perform a second digital signal processing procedure corresponding to a second mode of operation, and said system further includes:

means for switching control from said instruction control means to said instruction RAM after said first digital signal processing procedure is completed such that said system switches from said first mode to said second mode of operation.

21. The system according to claim 1, wherein said first plurality of data values in said first memory means are real and imaginary data values and said second plurality of data values in said second memory means are real and imaginary coefficient values, and wherein said instruction op codes are programmable and operative to control said system to perform the following operations during a single operating cycle within said plurality thereof: (1) transferring a first data value within said plurality thereof from said first memory means to said first register means, (2) transferring a second data value within said plurality thereof from said second memory means to said second register means, (3) multiplying data on said first multiplier means and produce a first product output, (4) multiplying data on said second multiplier means and produce a second product output, (5) performing an arithmetic operation on said first, second, and third arithmetic logic output, and (6) transferring said arithmetic logic output to said first and second register means.

22. The system according to claim 1, further comprising:

first and second product registers coupled to said first and second multiplier means respectively for storing said first and second product outputs respectively, said first input of said arithmetic logic means being coupled to said first product register, said second and third inputs of said arithmetic logic means being selectively coupled to either of said second product register and said first and second register means.

23. The system according to claim 22, wherein said first and second register means are each comprised of a plurality of registers, each of said first and second multiplier means includes first and second inputs, said first product output is obtained by multiplying a first selected register in said first register means with a second selected register selected from said first or second register means, said second product output is obtained by multiplying a first selected register in said second register means with a second selected register selected from said first or second register means, and logic means coupled to said first and second multiplier means for selecting said first and second selected register inputs to said first multiplier means and said first and second selected register inputs to said second multiplier means.

24. The system according to claim 23, wherein:

said plurality is eight and each of said eight registers in said first and second register means is comprised of 16 bits, each of said first and second product output registers is comprised of two concatenated 16 bit registers, and said arithmetic logic output is comprised of 32 bits of data which can be transferred to a selected one of said 16 bit registers in said first register means and a corresponding concatenated 16 bit register in said second register means.

25. The system according to claim 1, wherein a plurality of said simplex operations are performed during a single operating cycle within said plurality thereof.

* * * * *